US012651506B2

(12) United States Patent
Imutan et al.

(10) Patent No.: US 12,651,506 B2
(45) **Date of Patent: *Jun. 9, 2026**

(54) CONCURRENT DISPLAY AND INTERACTION BETWEEN GAME TYPES ON AN ELECTRONIC GAMING DEVICE

(71) Applicant: Aristocrat Technologies, Inc., Las Vegas, NV (US)

(72) Inventors: Cash Imutan, Henderson, NV (US); Bradley Hendricks, Las Vegas, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 17/705,223

(22) Filed: Mar. 25, 2022

(65) Prior Publication Data

US 2022/0215716 A1 Jul. 7, 2022

Related U.S. Application Data

(63) Continuation of application No. 16/927,120, filed on Jul. 13, 2020, now Pat. No. 11,328,553.

(51) Int. Cl.
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
CPC ............. G07F 17/3244; G07F 17/3262; G07F 17/3267; G07F 17/3258; G07F 17/34; G07F 17/3213
See application file for complete search history.

(56) References Cited

U.S. PATENT DOCUMENTS 5,584,763 A 12/1996 Kelly
6,186,894 B1 * 2/2001 Mayeroff ................ G07F 17/34 463/16

(Continued)

OTHER PUBLICATIONS

"Deuces Wild Video Poker! (live play) Triple Play Multi-hand", https://www.youtube.com/watch?v=joYz8LIWVv8, May 9, 2018.

(Continued)

*Primary Examiner* — Justin L Myhr
(74) *Attorney, Agent, or Firm* — Blank Rome LLP

(57) ABSTRACT

A method may include determining a first base game outcome of a first instance of a base game; controlling a display system to present the first base game outcome in a first window of one or more display devices of the display system; and in response determining whether a first feature game trigger condition of a feature game exist. Then in response to this determining, controlling the display system to present a first feature game in a second window of the one or more display devices concurrently with presenting the base game in the first window of the one or more display devices; determining a second base game outcome of a second instance of the base game; determining a first feature game outcome of a first instance of the feature game; controlling the display system to present the second base game outcome in the first window; and controlling the display system to present the first feature game outcome in the second window.

20 Claims, 19 Drawing Sheets

(56) References Cited

U.S. PATENT DOCUMENTS

| | | | | |
|---|---|---|---|---|
| 6,634,941 | B2 | 10/2003 | Olive | |
| 6,648,758 | B2 | 11/2003 | Bennett | |
| 6,652,378 | B2 | 11/2003 | Cannon | |
| 7,819,741 | B1 * | 10/2010 | Luciano | G07F 17/32 463/16 |
| 8,333,657 | B1 | 12/2012 | Nelson | |
| 8,371,927 | B2 | 2/2013 | Englman | |
| 8,915,786 | B2 | 12/2014 | Baerlocher | |
| 9,165,427 | B2 | 10/2015 | Thomas | |
| 9,390,580 | B2 | 7/2016 | Detlefsen | |
| 10,032,339 | B2 | 7/2018 | Mead | |
| 10,192,390 | B2 | 1/2019 | Hughes | |
| 10,810,840 | B2 | 10/2020 | Casey | |
| 2002/0183105 | A1 * | 12/2002 | Cannon | G07F 17/32 463/16 |
| 2003/0073480 | A1 | 4/2003 | Thomas | |
| 2005/0054419 | A1 | 3/2005 | Souza | |
| 2007/0060252 | A1 | 3/2007 | Taylor | |
| 2007/0060363 | A1 * | 3/2007 | Nguyen | G07F 17/34 463/42 |
| 2008/0026831 | A1 | 1/2008 | Wright | |
| 2008/0039177 | A1 | 2/2008 | Okada | |
| 2008/0076521 | A1 | 3/2008 | Little | |
| 2009/0124371 | A1 | 5/2009 | Gilmore | |
| 2010/0004047 | A1 | 1/2010 | Acres | |
| 2010/0029381 | A1 | 2/2010 | Vancura | |
| 2010/0041461 | A1 | 2/2010 | Demsetz | |
| 2011/0105218 | A1 | 5/2011 | Anderson | |
| 2011/0159942 | A1 | 6/2011 | Cram | |
| 2012/0172107 | A1 * | 7/2012 | Acres | G07F 17/34 463/16 |
| 2013/0267301 | A1 * | 10/2013 | Suda | G07F 17/3267 463/20 |
| 2013/0273997 | A1 | 10/2013 | Stewart | |
| 2013/0331173 | A1 | 12/2013 | Jaffe | |
| 2014/0248939 | A1 | 9/2014 | Kroon | |
| 2014/0309013 | A1 | 10/2014 | Meyer | |
| 2015/0199868 | A1 | 7/2015 | Kelly | |
| 2016/0027251 | A1 * | 1/2016 | SeLegue | G07F 17/3267 463/25 |
| 2016/0086431 | A1 | 3/2016 | Berman | |
| 2016/0247361 | A1 | 8/2016 | Meyer | |
| 2017/0092070 | A1 | 3/2017 | Marston | |
| 2017/0092073 | A1 | 3/2017 | Nakamura | |
| 2017/0103613 | A1 | 4/2017 | Berman | |
| 2017/0372558 | A1 | 12/2017 | You | |
| 2018/0182202 | A1 * | 6/2018 | Shiraishi | G07F 17/3213 |
| 2019/0188964 | A1 | 6/2019 | San | |
| 2020/0090457 | A1 * | 3/2020 | Wright | G07F 17/3209 |
| 2021/0217276 | A1 | 7/2021 | Sidoti | |

OTHER PUBLICATIONS

Office Action dated Aug. 3, 2021 for U.S. Appl. No. 16/927,120 (pp. 1-16).

Office Action (Notice of Allowance and Fees Due (PTOL-85)) dated Jan. 14, 2022 for U.S. Appl. No. 16/927,120 (pp. 1-8).

Office Action (Non-Final Rejection) dated Mar. 2, 2022 for U.S. Appl. No. 17/010,030 (pp. 1-13).

Office Action (Notice of Allowance and Fees Due (PTOL-85)) dated Sep. 16, 2022 for U.S. Appl. No. 17/010,030 (pp. 1-8).

Office Action (Non-Final Rejection) dated Jul. 3, 2024 for U.S. Appl. No. 18/146,917 (pp. 1-20).

* cited by examiner

CONCURRENT DISPLAY AND INTERACTION BETWEEN GAME TYPES ON AN ELECTRONIC GAMING DEVICE

CROSS REFERENCE TO RELATED APPLICATION

This application is a Continuation of co-pending U.S. Pat. No. 11,328,553, filed May 19, 2020 and entitled "Gaming Device With Player Choice Randomised Based On Game Play Outcome", which claims priority to Australian Patent Application Serial No. 2020900626, filed Mar. 3, 2020 and entitled "Gaming Device with Player Choice Randomised Based on Game Play Outcome," all of which are incorporated by reference herein in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In existing gaming methods and systems, a base game is commonly presented to the player, and optionally, a feature game will be may be triggered, for example, after conclusion of the base game results in a base game outcome. Such a feature game typically presents players an additional opportunity, or a greater opportunity, to win different awards or larger awards than may be wondering the base game. In some examples, such a feature game can offer different gameplay from that available during the base game.

The popularity of such gaming machines with players is often dependent on the graphical user interface usability and gaming machine's capability to enhance the user experience or new gaming functionality that could extend player time on the gaming machine. The gaming businesses therefore strive to provide new gaming functionality that not only engages players to use the gaming machines, but also have the machine satisfy gaming regulations that include maintaining a target RTP and game fairness. Specifically, the selective presentation of a feature game, with different or increased award opportunities, can provide a relatively enhanced user experience. Both the gameplay and the presentation of the feature game can also impact the game's volatility. As a result, any improvement to aspects of the game that produces a better user experience for the player would also need to be balanced with gaming regulation requirements.

BRIEF SUMMARY

In summary, the detailed description presents a number of innovations in user interface (UI) features of electronic gaming devices as well as innovations in features of backend processing to implement the UI features. For example, some innovations relate to allowing a base game and a feature game to proceed together on the same display. Other innovations include having multiple feature games be presented at the same time as a base game. Further innovations may include determining that a feature game trigger condition has occurred in either the base game or feature game and activating another feature game. In another example innovation, symbols from the outcome of a base game may be copied to a feature game as well as the reverse or copying from feature games to feature games.

For example, according to a first set of innovations described here, a computer system (e.g., a game controller) is configured to perform back end operations to control a UI of a gaming device. For example, the game controller may execute instructions which cause the game controller to perform various operations for concurrent display of a base game and one or more feature games on a display. For example, the game controller may be caused to determine a first base game outcome of a first instance of a base game based on a random number generator outcome. The game controller may be caused to control the display system to present the first base game outcome in a first window of the one or more display devices. In response to the first base game outcome, the game controller may be caused to determine whether a first feature game trigger condition of a feature game exists. When the first feature game trigger condition of a feature game exists, the game controller may be caused to control the display system to present a first feature game in a second window of the one or more display devices concurrently with presenting the base game in the first window of the one or more display devices. Additionally, the game controller may be caused to determine a second base game outcome of a second instance of the base game and determine a first feature game outcome of a first instance of the feature game. The game controller may then control the display system to simultaneously present the second base game outcome in the first window and present the first feature game outcome in the second window.

As an example, according to a second set of innovations described herein, a computer system is configured to perform UI-focused operations to control the UI of an electronic gaming device. The UI-focused operations include displaying, in a first window of one of more display devices of a display system, a first base game outcome of a first instance of a base game. In an example, the first base game outcome may include symbols that satisfy a first feature game trigger (e.g., a combination of symbols that results in a feature game being activated). The operations may further include displaying, subsequent to the display of the first base outcome, a first feature game in a second window of the one or more display devices concurrently with presenting the base game in the first window of the one or more display devices. Additionally, the operations may include displaying a second base game outcome of a second instance of the base game in the first window. Then, a first feature game outcome of a first instance of the first feature game may be displayed in the second window concurrently with displaying the second base outcome of the second instance of the base game.

The innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
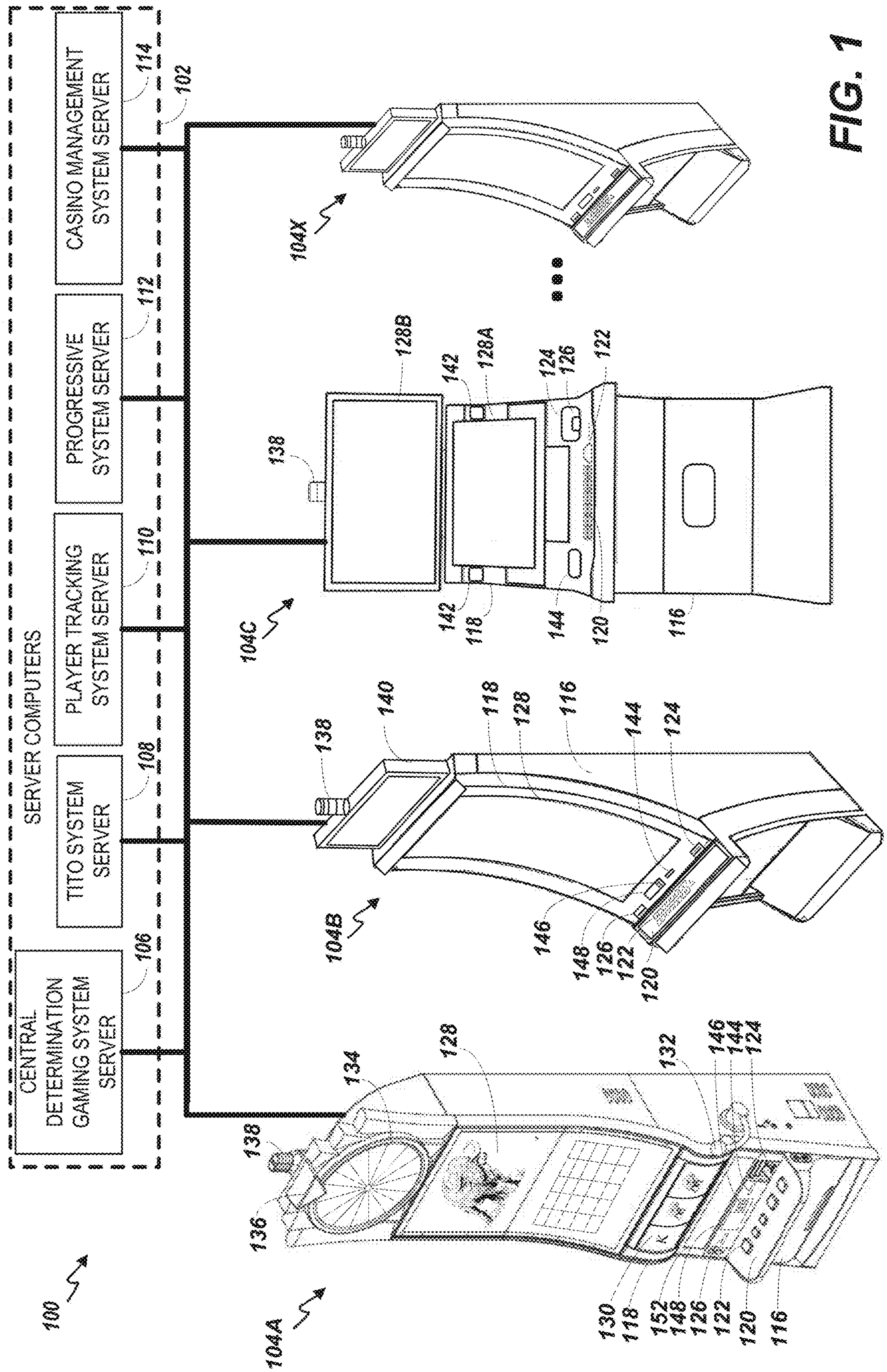
FIG. 1 is a diagram showing several EGMs networked with various gaming related servers, according to various examples.

A limitation of gameplay on EGMs is the inability for a player to play a feature game (e.g., a bonus game) at the same time as the base game. For example, as the user plays the base game, a feature game may be triggered based on an outcome of the base game. The feature game will then replace the base game on a display of an EGM. At this time, the player is unable to continue to play the base game until the feature game runs its course.

The inability for the player to continue the base game presents a number of challenges. For example, the player may not be able to tell if they are supposed to—or even have the ability to—continue to play the base game. Furthermore, the player may not know how long until the feature game ends. This time may be considerable if free spins continue to be accumulated on the feature game. The lack of information may result in confusion for the player if the player is new and not familiar with the game mechanics of base games and feature games.

Described herein are example implementations that improve user interfaces (UI) and gaming device operations that allow a gaming machine to present and execute a base game concurrently with one or more feature games. For example, when a base game outcome triggers a feature game, the UI may display the base game in a first window on a display of an EGM. The feature game may be displayed in a second window on a display of the EGM while the base game is displayed in the first window. The gaming device may continue to execute the base game at the same time the feature game is executing. In some instances, multiple feature games may be presented with the base game at the same time. Thus, the implementations herein improve efficiency of the presentation of the game to a player as well as gaming device operations, where feature games may be presented in parallel with a base game (and/or bonus games may be presented in parallel with a feature game and/or a base game). These presentations may also improve the user interface and/or gaming device operations by reducing time when a player is passively watching a feature of bonus game, which may be of lesser interest to the player. Additionally, these improved presentations increase the locations where the player can observe progress of the gameplay, to further enhance engagement of the player, and thereby improve the user experience.

The UI and gaming device operations may also be set up such that a player may understand that there is the possibility of having multiple bonus games occurring at the same time as the base game. For example, there may be a graphical indication (e.g., chains covering a window or greyed out graphics) for non-active feature games. As more triggers occur in the base game—or already active feature games—the non-active feature games may become active. Consequently, the UI and gaming device operations are established such that a player may readily ascertain a goal of the game is to unlock the feature games. Again, this visual representation of achievement of sequential goals of the game helps inform the player has two objectives of the game and engage the player's attention.

Another benefit of having concurrent play of a base game and feature game is the ability for symbol copying. For example, if the base game has a wild symbol or multiplier symbol, the wild symbol or multiplier symbol may be copied into the feature game. Similarly, if the feature game has a wild symbol or multiplier symbol at the end of a spin, and if the base game is still continuing, these symbols may be copied to the base game. Additional variations of interactivity between the base game and feature game are described in further detail below.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
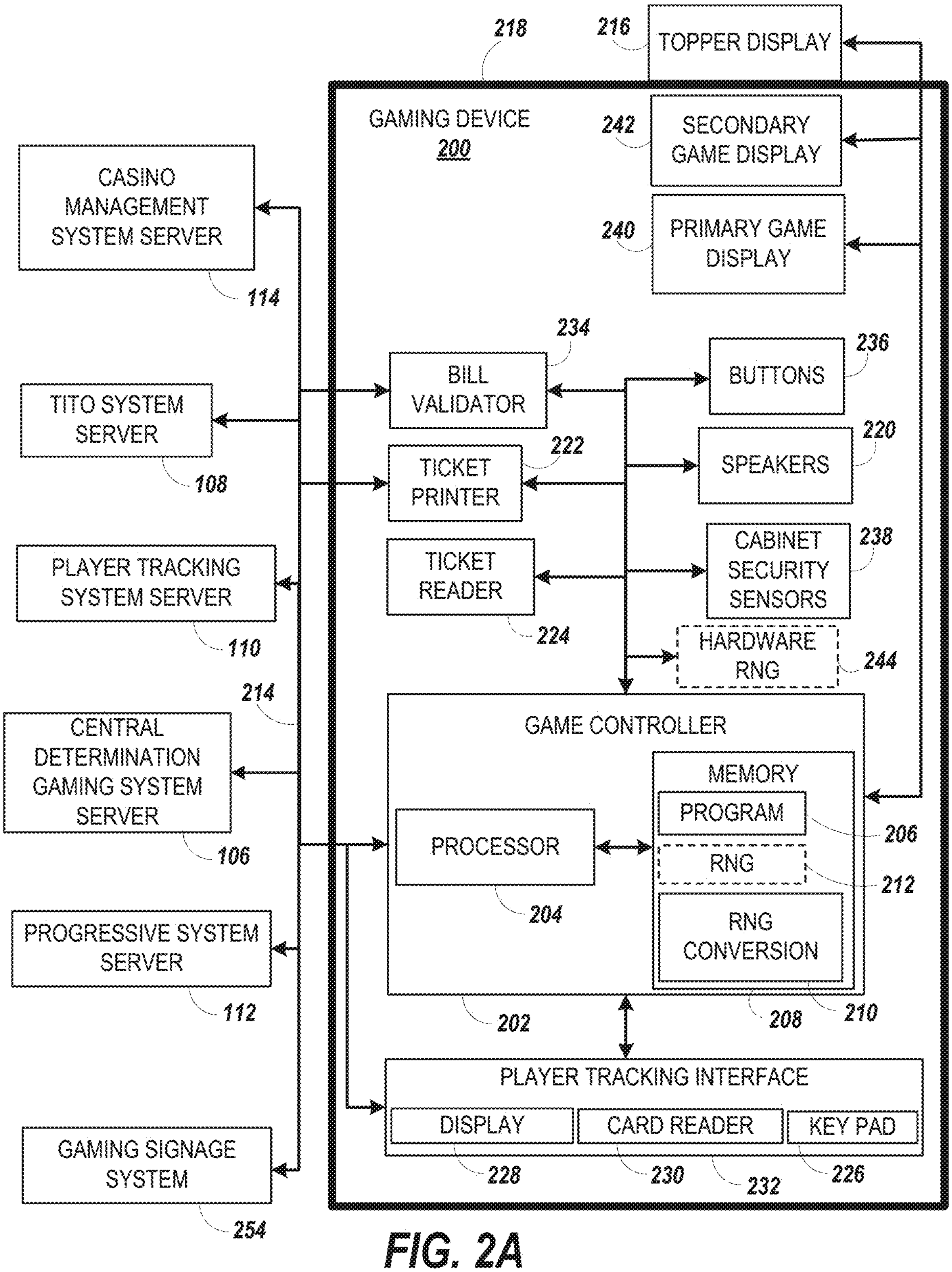
FIG. 2A is a block diagram showing various functional elements of an EGM, according to various examples.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes (e.g., Mini, Minor, Major, and Grand) available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify, and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top-to-bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., for a random number RND, generated by an RNG, in the range of 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, sub-ranges within the range for a random number. In some example implementations, the threshold values for a weighted table are represented as count values for the respective entries of the weighted table. For example, the following table shows count values for the four options described above:

TABLE 1

EXAMPLE WEIGHTED TABLE

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and predetermined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
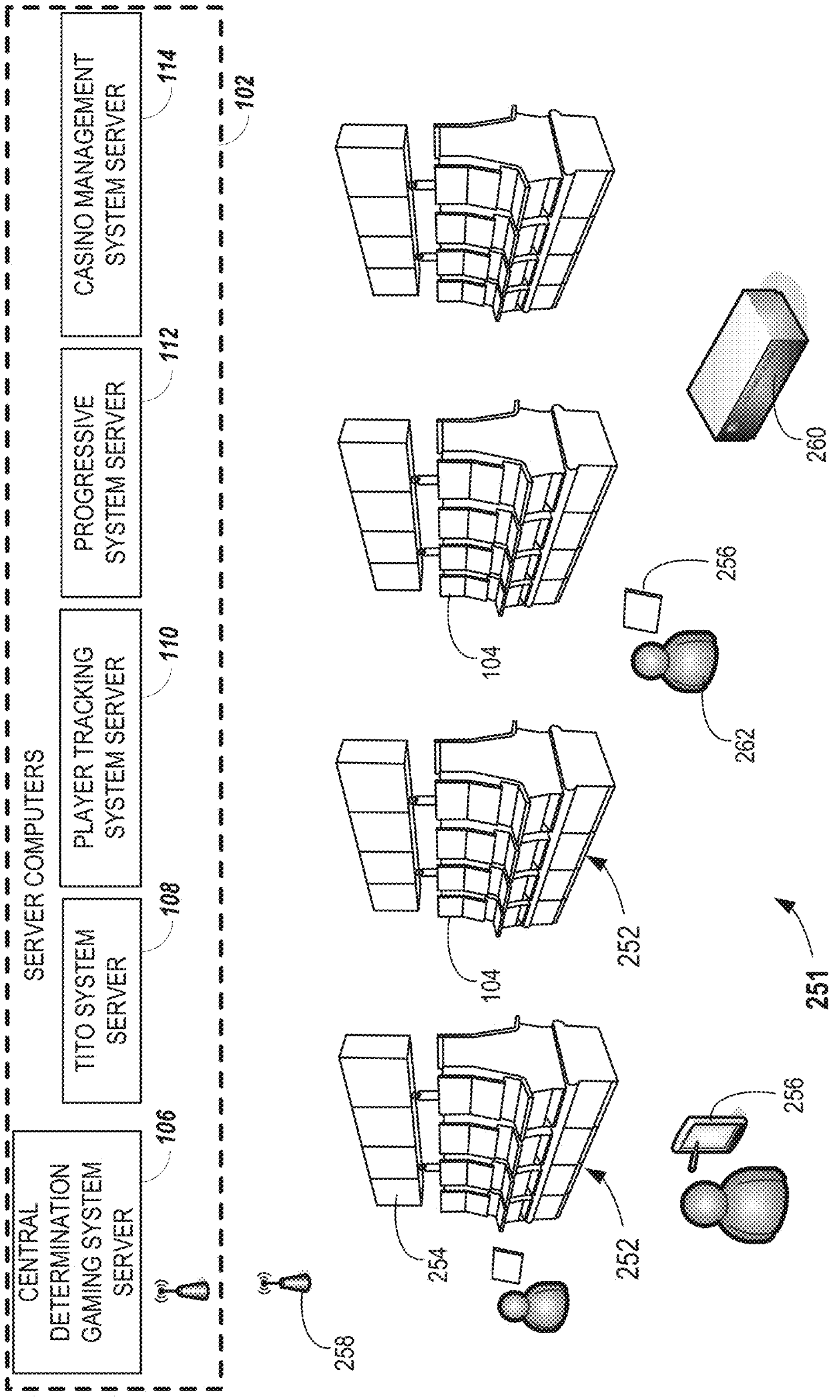
FIG. 2B depicts a casino gaming environment, according to various examples.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones, and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash-in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
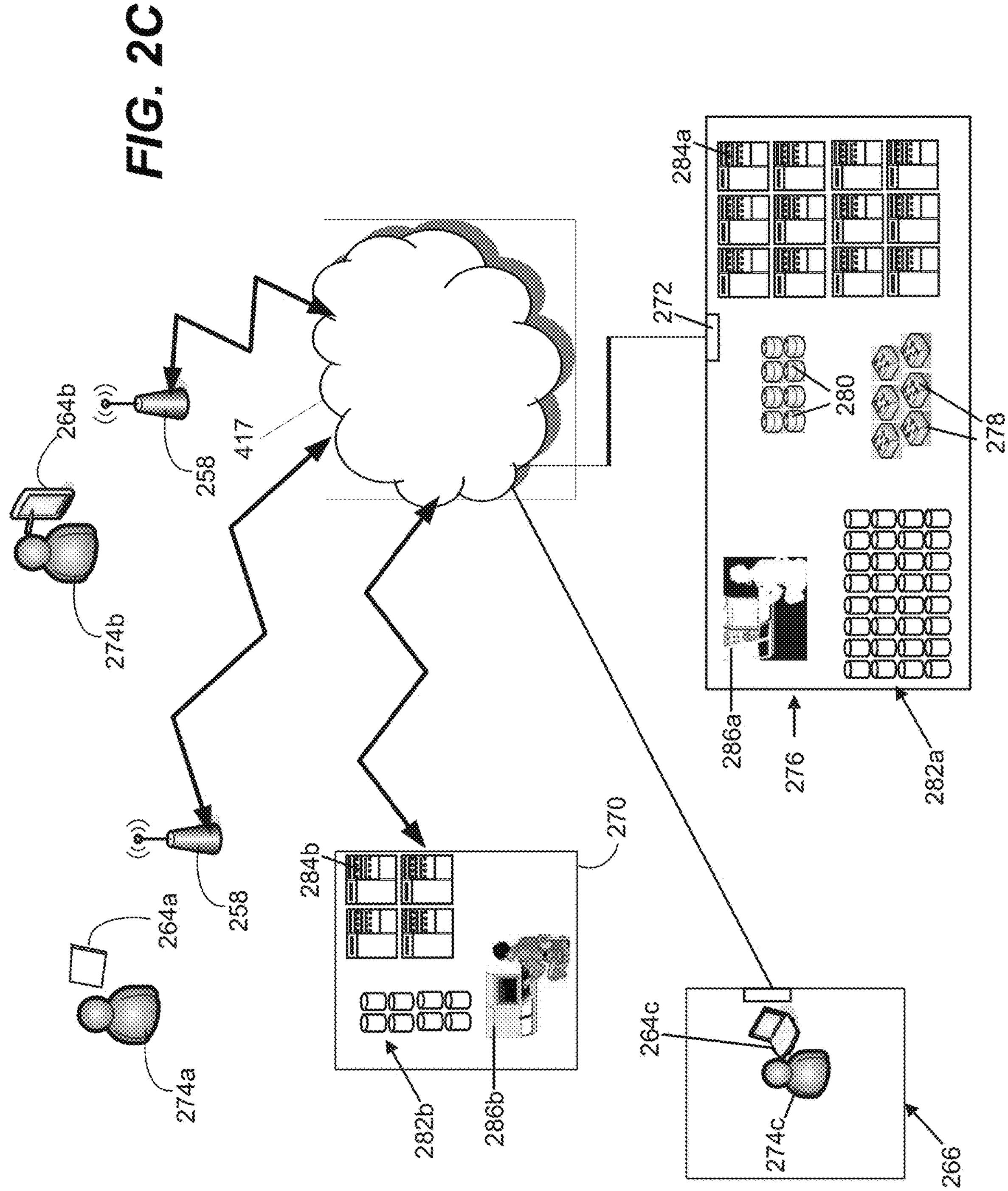
FIG. 2C is a diagram that shows examples of components of a system for providing online gaming according to some aspects of the present disclosure, according to various examples.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash-in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
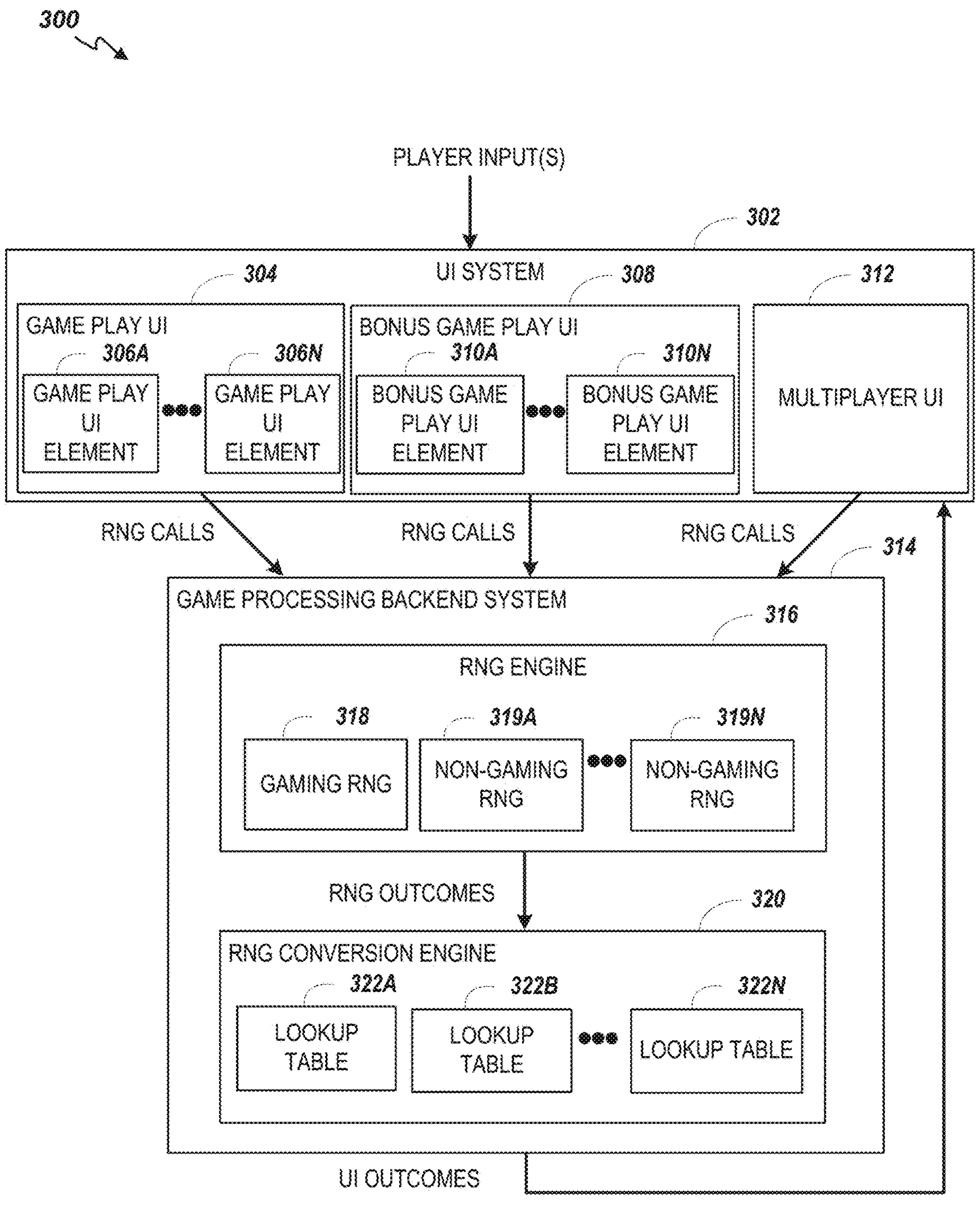
FIG. 3 illustrates, in block diagram form, an implementation of a game processing architecture algorithm that implements a game processing pipeline for the play of a game in accordance with various implementations described herein, according to various examples.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games (e.g., a feature game). The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could correspond to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

Figure 4:
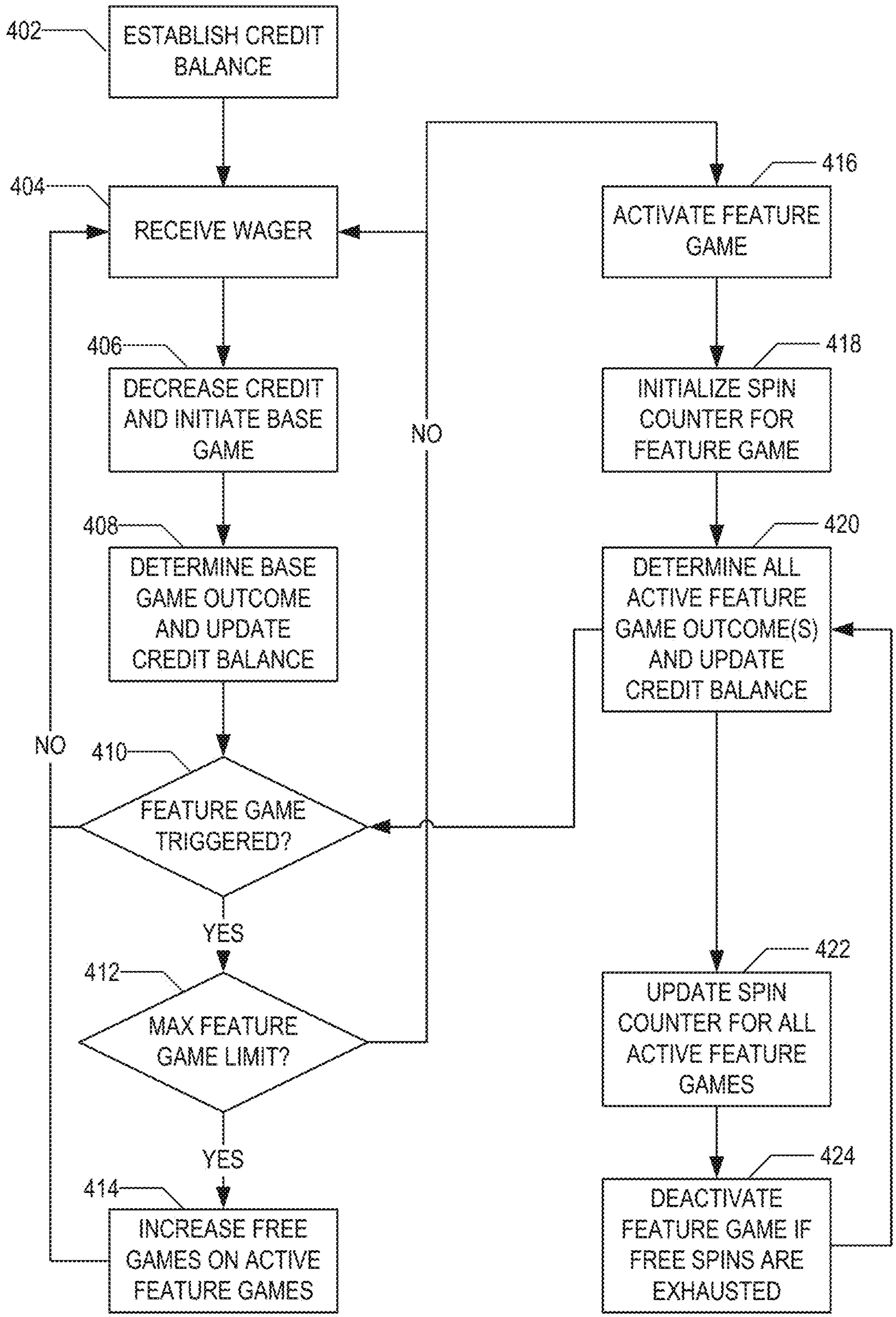
FIG. 4 is a flowchart illustrating a set of operations of a process to concurrently display a base game and a feature game, according to various examples.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline FIG. 4 is a flowchart 400 illustrating a set of operations of a process to concurrently display a base game and a feature game, according to various examples. The process may be implemented using gaming device 200, in various examples. Additionally, the operations may be performed using a game processing architecture such as described in FIG. 3. More specific references to the game processing architecture and components of gaming device 200 are made below in the context of the operations of FIG. 4.

The process may begin when a player initiates play of a base game on a gaming device, such as gaming device 200 (e.g., UI system 302 may receive an input from a player using game play UI 304). At operation 402, gaming device 200 may establish a credit balance for the player. The credit balance may be displayed on player tracking display 228 in various examples. To this end, a player may insert a physical item having monetary value into a credit input mechanism or device, such as the ticket reader 224 or bill validator 234, of the gaming device 200. In response to the received physical item, the gaming device 200 may increase a credit value of a credit meter displayed to a player based on the monetary value of the physical item.

At operation 404, the gaming device 200 may receive a wager. A player may use the player input buttons 236 to specify a value of an amount to be wagered with the wager being funded by the credit value of the credit meter. The gaming device 200 may display a message such as "Press SPIN to play" in a message box, e.g., on the primary game display 240. When the player presses a SPIN button, e.g., in the player-input buttons 236, the gaming device 200, at operation 406, may decrease the player's credit balance by the specified wager and initiate play of a spinning reel game (e.g., the base game) by spinning one or more reels.

Next, at operation 408, the gaming device 200 may determine a base game outcome and update a credit balance of the player. The base game outcome may be based on an RNG call to game processing backend system 314, for example, that obtains the base game outcome using a lookup table (e.g., lookup table 322A) based on an RND generated by gaming RNG 318. For example, gaming device 200 may stop the reels based on one or more random values generated by RNG 212 to obtain the base game outcome comprising a matrix, or any other formation or arrangement, of symbols. In other embodiments, gaming device 200 may stop the reels based on information received from central determination gaming system server 106, or using a bingo game outcome. In various examples, the base outcome may result in one or more progressive jackpots (e.g. Mini, Minor, Major, and Grand) being won.

Gaming device 200 may then determine whether the symbols displayed in the display matrix include one or more winning symbol combinations (e.g., based on RNG conversion engine 320). For example, gaming device 200 may determine if there are any winning combinations of symbols along one of the activated paylines. Winning symbol combinations along the activated paylines may result in the award of prize(s) by increasing the credit value of the credit meter based on the prize(s) for such winning combination(s).

Gaming device 200 may adjust the credit balance on the credit meter in accordance with any winning symbol combinations that were identified in operation 408. Gaming device 200 may also control primary game display 240 to provide a message reflective of the game outcome. For example, when the game outcome includes one or more winning symbol combinations, the primary game display 240 may display a message such as "Congratulations—You Won X Credits!" (where X is the number of credits won by the player). Conversely, when the game outcome does not include any winning symbol combinations, a message such as "Sorry—You Didn't Win—Spin Again" may be displayed to the player.

At operation 410 it is determined whether a feature game trigger condition has occurred. As discussed later, the feature game trigger condition may occur in a base game or feature game; however, in the present example it assumed the feature game trigger condition is checked with respect to the outcome of the base game.

A feature game trigger condition may be satisfied on the occurrence of one or more trigger symbols in the base game outcome or trigger symbols in a feature game outcome, as generated by game processing backend system 314; or in other embodiments the feature game trigger condition may be established at random, or by some other process. Subsequent to determining a trigger condition has been satisfied, game processing backend system 314 may send the UI outcome determined through use of RNG outcomes 320 back to UI system 302 for presentation on the gaming device.

In various embodiments, the minimum number of trigger symbols needed to trigger the feature game may be predetermined, randomly determined, or based on a wager amount, etc. In certain embodiments, the trigger symbols may be certain types of symbols (e.g., credit symbols, certain value symbols), or other specific forms of configurable symbols. The satisfaction of a feature game trigger condition may include a change in appearance of the configurable symbol, such as a change in color, shape, or other appearance of one or more configurable symbols contributing to the trigger condition, which also may also include a text indication of the trigger condition. In an example embodiment, a feature game triggering event will occur when at least a predetermined quantity of, such as six, configurable symbols are displayed in the base game outcome. If a feature game trigger condition has not been met, flow continues back to operation 404.

When the feature game trigger condition has been met, operation 412 determines if a maximum number of feature games have already been activated on gaming device 200. An additional constraint may be the processing power needed to simultaneously play—and determine outcomes for—the feature games and the base game. For example, each gaming device 200 may have a limited amount of display area for which to show a base game and feature games. Accordingly, one gaming device 200 may have the maximum number of feature games set at four, whereas another may have six.

In various examples, operation 412 may be performed with respect to the number of active feature games on gaming device 200. For example, primary game display 240 may present the base game in one window (e.g., a visible or non-visible partition of primary game display 240) and each available feature game in its own respective window. Each feature game may be either active or inactive. An active feature game signifies that the feature game has been triggered.

An inactive feature game may be visually distinct from an inactive feature game. For example, there be graphical depictions of chains with a lock in the center that are overlaid on the reels of an inactive feature game. In other examples, there may be a message displayed below the inactive feature game that the inactive feature game is locked. In other examples, colors of the inactive feature game may be presented with less saturation—or other color effect.

Even if a feature game is inactive, gaming device 200 may present (e.g., using bonus game play UI 308) the reels of the inactive feature game as spinning during an instance of the base game or an active feature game. Consequently, gaming device 200 is configured such that a player may be able to see which symbols are on the inactive feature game reels, should it be activated.

Each feature game (inactive or otherwise) may have different symbols or frequency of certain symbols, in various examples. Accordingly, if there are four possible feature games to activate, the last feature game that may be activated may have a higher percentage of possible wild symbols or higher payout symbols compared to the first feature game activated. Thus, the payouts between different feature games may be different. For example, for the overall game RTP to be 90%, the base game could have an RTP of 50% while the first game feature has an RTP of 150%, the second game feature has an RTP of 200%, the third game feature has an RTP of 300%, and the fourth game feature has an RTP of 400%. The trigger rate for each bonus feature decreases since the RTP is much higher for the fourth game feature. Accordingly, the RTP contribution of a particular feature game would be the feature game spin's RTP multiplied by its chance to trigger. The chance to trigger for each feature game gets smaller for each subsequent feature game such that the RTP contribution is balanced.

The changes may be progressive such that the last possible feature game that may be activated has the highest percentage of wilds or highest payout symbols. As discussed in further detail below, the feature game trigger conditions may also differ between feature games. Accordingly, even though the last feature game may have the highest possible payout, the trigger conditions for activating the last feature game may be higher (e.g., more scatter symbols) than triggering an additional feature game in a first feature game. The term "scatter symbols" is used herein to identify symbols that individually or in combination may establish a trigger condition for a feature game (from a base game), or in a feature game, for an additional feature game. Thus, such scatter symbols may include symbols of multiple graphical forms providing that functionality in a base or feature game.

Returning back to flowchart 400, once it is determined that the maximum feature game limit has not been met, at operation 416 a feature game may be activated. Activating may include updating one or more display devices of gaming device 200 to display the base game concurrently with the activated feature game using game play UI 304 and bonus game play UI 308. For example, primary game display 240 may be split into two windows stacked vertically. The base game may continue to be presented in a lower of the two windows (e.g., a first window) and the feature game may be presented in the higher of the two windows (e.g., a second window). The multiple windows can be displayed on a single display screen (e.g., primary game display 240, or secondary game display 242). Or, the multiple windows can be split among multiple display screens (e.g., two windows on a first display screen, and a third window on a second display screen). A message may also be presented overlaid on the base game that informs the user that the feature game has been activated and to look "up" to see the feature game.

In general, a window spans m reels in a first dimension and spans n symbols in a second dimension orthogonal to the first dimension. The value of m can be 4, 5, 6, 7, 8, or some other number of reels. The value of n may be 2, 3, 4, 5, 6, or some other number of symbols. In some example implementations, the reels in a window are organized in a 5×3 configuration (5 reels, with 3 symbols visible per reel). Typically, the m reels are arranged horizontally in the window from left-to-right, with the m reels spinning vertically and the window showing n symbols of each of the respective reels. Alternatively, the m reels are arranged vertically in the window from top-to-bottom, with the m reels spinning horizontally and the window showing n symbols of each of the respective reels. Also, instead of having the same value of n for all reels across a window, the window can have different numbers of symbols visible for different reels. Thus, the value of n can be different for different reels (e.g., n=3 for a leftmost reel, n=4 for a second reel, n=5 for a center reel, n=4 for a fourth reel, and n=3 for a rightmost reel). Each of the reels has an associated reel strip that is movable through a window upon a spin of the reel.

The manner in which a feature game may be activated may be based on how the game elements of the base game (e.g., game play UI elements 306) and the game elements of the feature game (e.g., bonus game play UI element 310) are arranged prior to the feature game being activated. For example, in one variation, the feature game(s) are not presented—in any fashion—prior to the feature game being activated. Thus, in that variation, graphics that are current displayed in an upper window may be replaced by the feature game. Furthermore, should a second feature game be activated, the second window may be resized (e.g., half of its original width) and a third window may be presented with the second feature game. The third window may be the same width as the second window in various examples. The process of resizing windows may be repeated until the maximum number of feature games has been reached.

In an example, in which gaming device 200 is configured to make inactive feature games visible to the player (e.g., via bonus game play UI 308), activating a feature game may include removing the indications that the feature game was inactive. For example, the colors of a previous inactive feature game may be set to the same saturation as other active feature games, or an animation of unlocking a lock may be presented.

At operation 418, the spin counter for the activated feature game may be initialized. For example, the spin counter may be a value of free spins that a player has won based on the base game outcome as determined by an RNG call from UI system 302 to game processing backend system 314.

At operation 420, outcomes of all instances of active feature games may be determined (e.g., based on RNG conversion engine 320) and the credit balance updated. In some examples, instances of inactive feature games may be determined as well if they are currently displayed to the player. An outcome of a feature game may lead to further triggering of another feature game. In these instances, flow may branch back to operation 410 to determine if another feature game may be activated. In various examples, a feature game outcome may result in one or more progressive jackpots (e.g. Mini, Minor, Major, and Grand) being won.

Trigger rates for triggering a feature game within a feature game may be different than the trigger rate within the base game. Furthermore, the trigger rate with respect to feature games may be different among the feature games themselves. For example, the first feature game that is activated may have a higher chance of triggering a second feature game than the second feature game's trigger rate with respect to activating a third feature game. The triggering rates may be stored in a lookup table (e.g., lookup table 322A) that are used when an RNG call is made from UI system 302, in various examples. Each feature game may have its own lookup table, in many examples with different weighting, to allow for different triggering rates between feature games.

Furthermore, increasing a triggering rate may be achieved by having different reel strips (potentially with different symbol sets), for each of the N possible feature games a gaming device may unlock (e.g., based on a game outcome). For example, a reel may have a greater density of trigger symbols to increase the trigger frequency. In various examples, the symbols in a reel may remain unchanged in order to maintain a consistent trigger frequency. As discussed in greater detail above, an overall game RTP may be maintained, for example by use of separate weighted tables for each triggered feature game. Thus, game play may be kept fair and consistent with regulations while also enabling variation of volatility for the designated level of RTP. Accordingly, the described examples are not merely new game rules or new display patterns.

In various examples, operation 420 and operation 408 occur in a synchronous manner. Thus, when a spin input is received from a player, gaming device 200 may initiate a spin on the base game and spins on the feature games at the same time. In other examples, the feature games are played asynchronously from the base game—and/or each other in some instances. Accordingly, the feature games may progress through their respective spins (and outcomes) without any additional input from the player whereas spin inputs are still received for the base game. One advantage of synchronous play is that a gaming device (e.g., gaming device 200) and its respective game play UIs (e.g., game play UI 304 and bonus game play UI 308) are configured to permit previously unavailable interactivity between the base game and feature games due to the games both being displayed. This interactivity may result in copying symbols between base games and feature games as further discussed below with respect to FIG. 7.

At operation 424, feature games for which their free spins are exhausted (e.g., at zero) are deactivated. Deactivating a feature game may include providing an indication (e.g., using bonus game play UI 308) on the feature game that it is inactive as discussed above. In instances in which inactive feature games are not presented, deactivating may include removing the window of the deactivated feature game and resizing the remaining windows of the feature games.

When a feature game trigger condition has been met (e.g., using RNG outcomes 320 as discussed previously), but the maximum number of concurrent feature games is met (e.g., operation 412), the number of free games (e.g., extra spins) on the existing feature games may be increased. For example, the feature game trigger condition would normally result in a new feature game with eight free spins, each of the existing feature games would receive an additional eight free games. As indicated previously, a feature game trigger condition may occur in the base game or any of the active feature games.

In various examples, the feature game trigger conditions may differ between a base game and a feature game, as well as between feature games. For example, a feature game trigger condition in a base game may require three scatter symbols, but a feature game trigger condition that occurs within a first feature game may require two scatter symbols, while a feature game trigger condition in a second feature game may require four scatter symbols. Other differences in trigger conditions between a base game and feature games and/or between multiple feature games may be provided by game processing backend system 320, for example.

Furthermore, the feature game trigger conditions may be based on the number of feature games currently being presented by a gaming device. For example, if there is single game active, the feature game trigger conditions may require three scatter symbols on a game outcome (feature game or base game). Then, once two feature games are active, the feature game trigger condition (for each feature game, or for each feature game and the base game) may only require two scatter symbols in all subsequent feature games (or may require a greater number of scatter symbols). Once only a single feature game remains active, the feature game trigger condition may revert back to requiring three scatter symbols.

In various examples, instead of (or in addition to) adding free spins to existing feature games when the maximum number of concurrent feature games is met, a gaming device may perform other operations. For example, a jackpot prize may be awarded, a bonus multiplier may be added to all active games, additional wild symbols or credit symbols may be added to one or more reels of one or more games, etc.

FIG. 5A to FIG. 5H are figures depicting example display screens that represent stages of game play in accordance with the process described in FIG. 4.

For example, display screen 502 may be a block representation of information presented on a display device of a gaming device such as primary game display 240. As depicted, there is a base game window 504 illustrating the symbols associated with an outcome of the base game (e.g., operation 408). Graphic window 506 may present artwork or other information associated with the base game, in various examples.

Figure 5B:
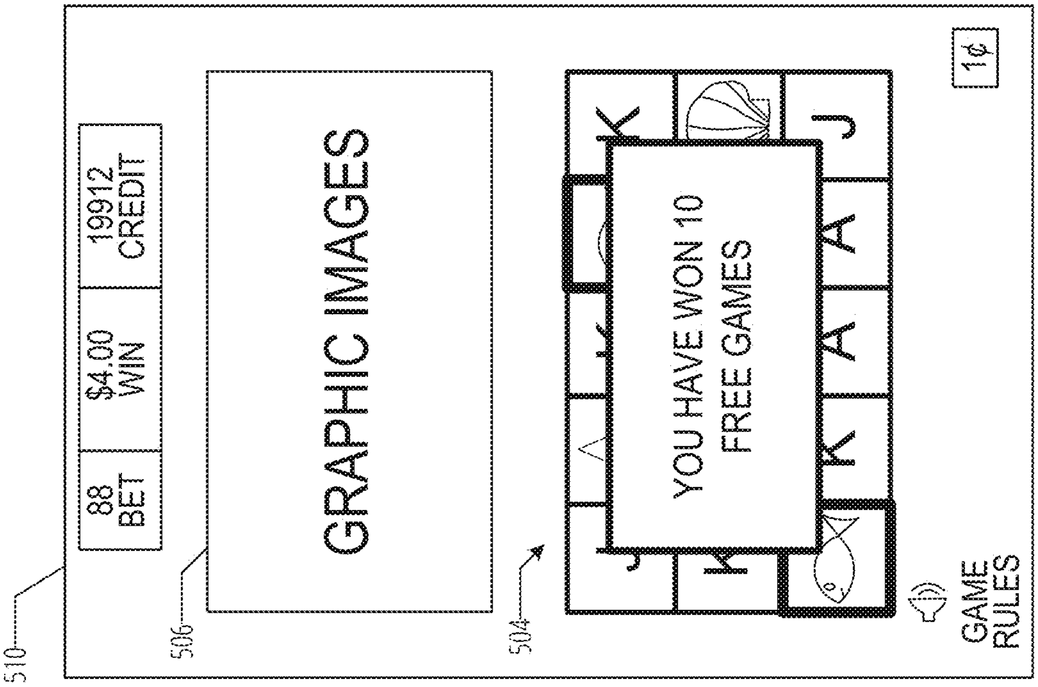
FIG. 5A-FIG. 5H are figures depicting example display screens that represent stages of game play, according to various examples.
Figure 5A:
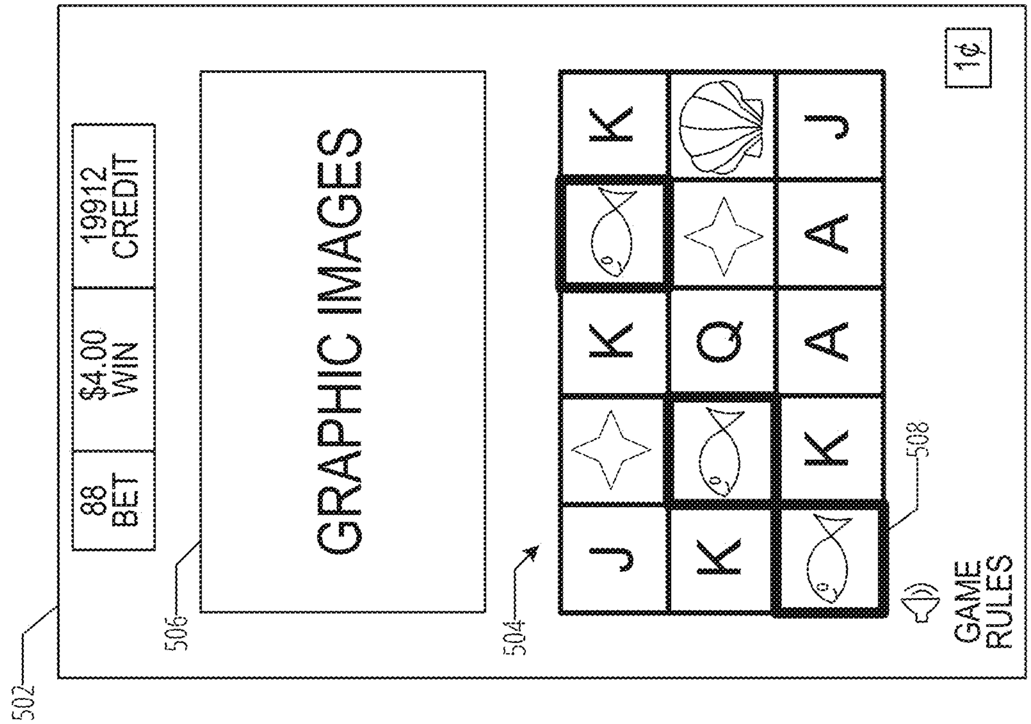

As depicted, the outcome of the base game includes three trigger symbols (e.g., trigger symbol 508 depicted as a fish). In this simplified example, when three trigger symbols are in the results symbol set of an instance of a base game, a feature game is triggered. Other trigger conditions may be used as discussed previously. FIG. 5B illustrates display screen 510. Display screen 510 includes a message in base game window 504 that a feature game has been triggered.

Figure 5C:
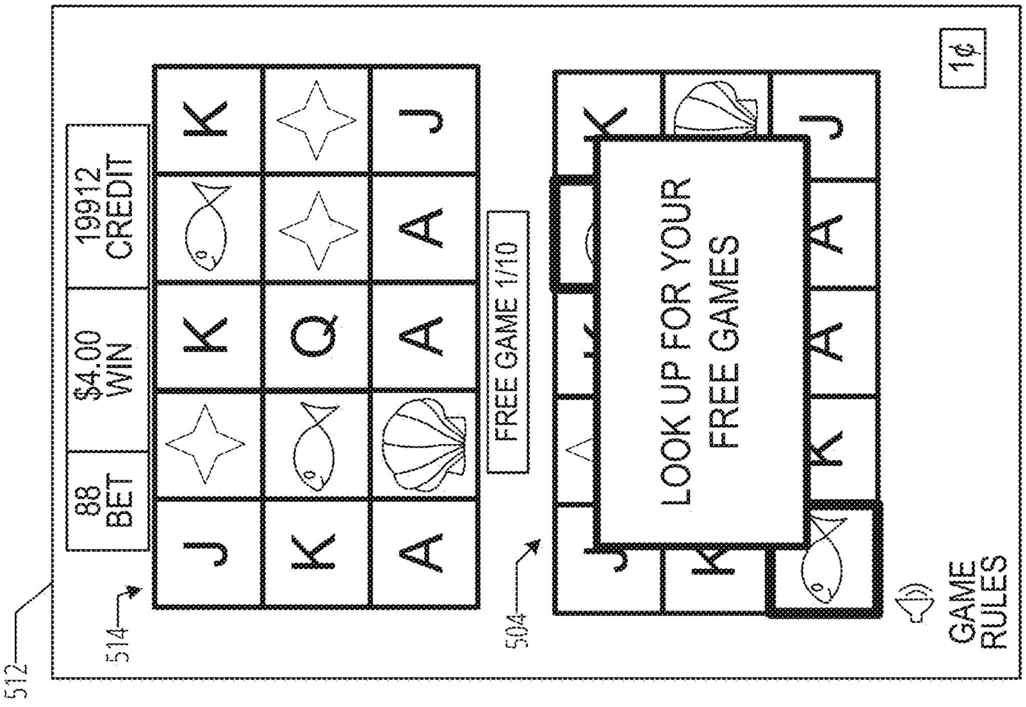

FIG. 5C illustrates display screen 512. In various examples, display screen 512 includes base game window 504 and feature game window 514. As shown, graphic window 506 has been replaced with a first instance of the feature game in feature game window 514 (e.g., operation 406). The type of symbols in the outcome of an instance of the feature game are illustrated as being the same as the type of symbols in the base game; however, different symbol sets and number of reels may differ in various examples. Additionally, a message has been presented in base game window 504 to inform the player that the feature game is being presented above base game window 504.

Figure 5D:
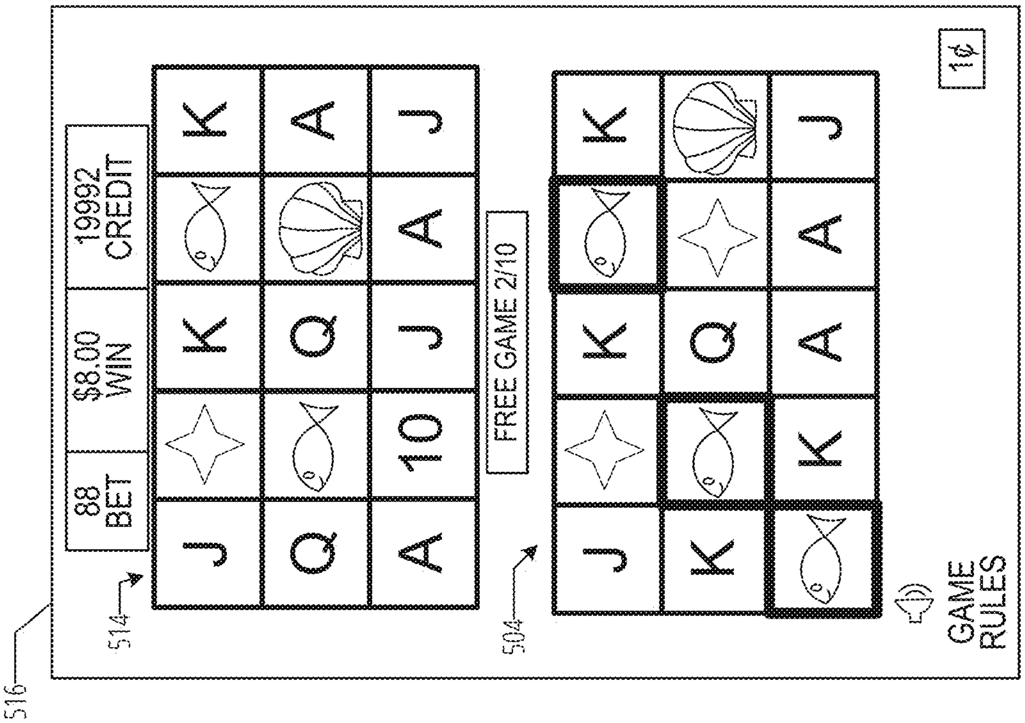

FIG. 5D illustrates display screen 516. Here, it can be seen that the free spin counter for the feature game presented in feature game window 514 has been increased from one to two. Additionally, both feature game window 514 and base game window 504 have been updated to include symbols associated with an outcome of a second instances of the feature game and a second instance of the base game, respectively. In the instance case, the outcome of the second instance of the base game results triggers another feature game based on base game window 504 showing three trigger symbols. FIG. 5E illustrates display screen 518 in which another message is presented in base game window 504 to inform the user they have won free games again.

Figure 5F:
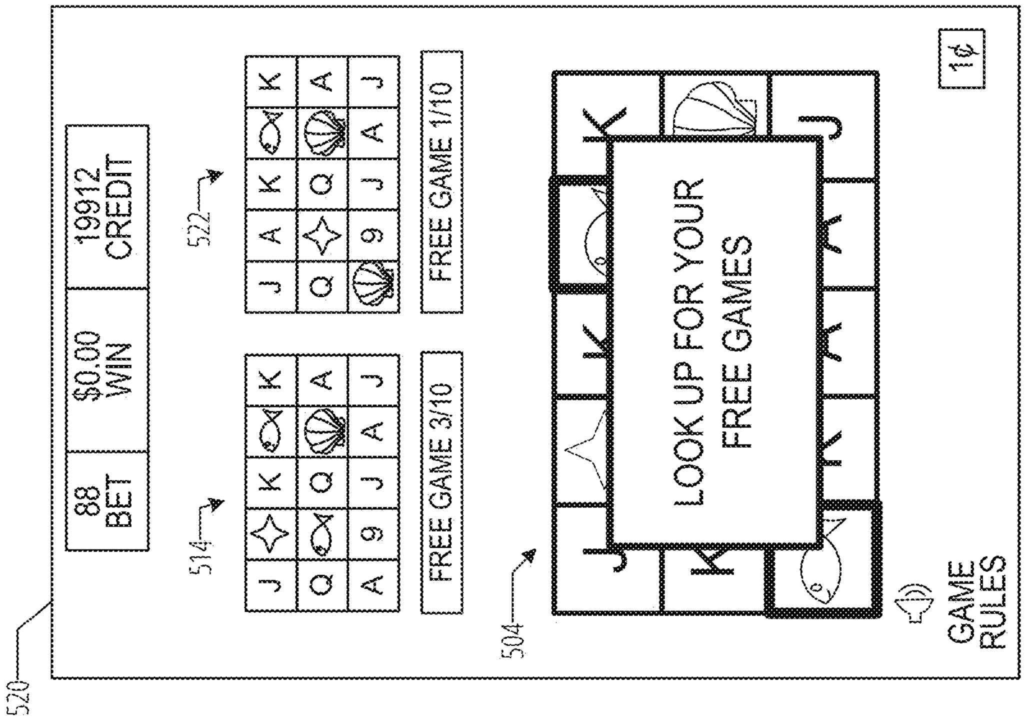
Figure 5E:
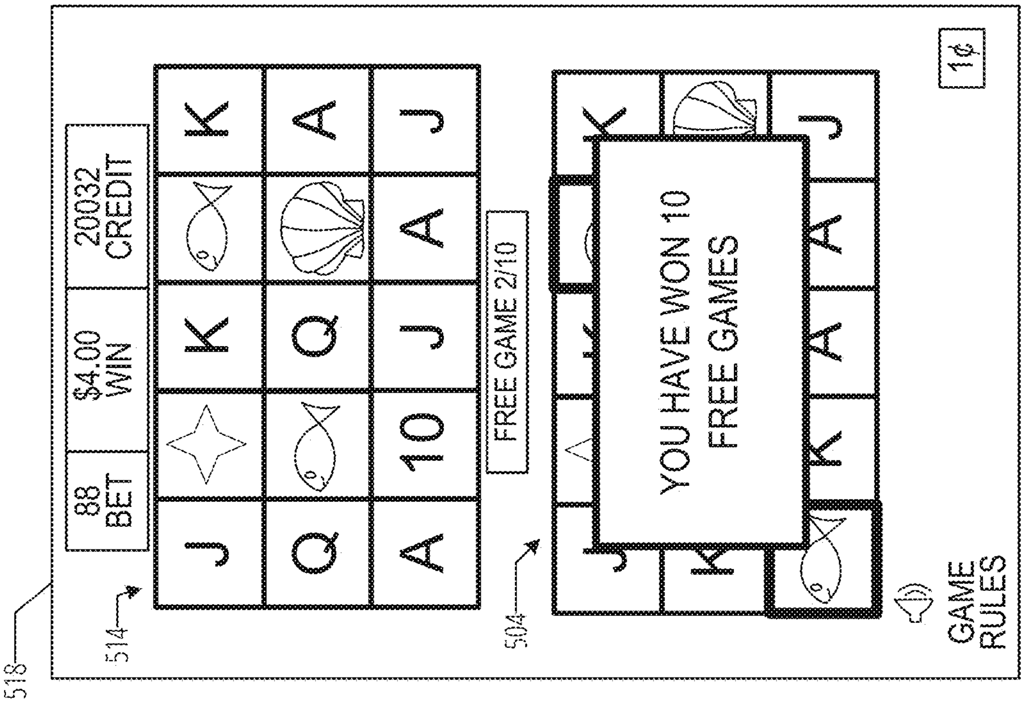

FIG. 5F illustrates display screen 520 which introduces feature game window 522. Feature game window 522 may include a second feature game. The second feature game may be of the same type as the feature game presented in feature game window 514 in various examples. Similarly, the set of available symbols on reels of the second feature game may be the same or different than the base game or first feature game and may occur at different frequencies. As illustrated, the size of feature game window 514 has shrunk to accommodate the presentation of feature game window 522.

Figure 5H:
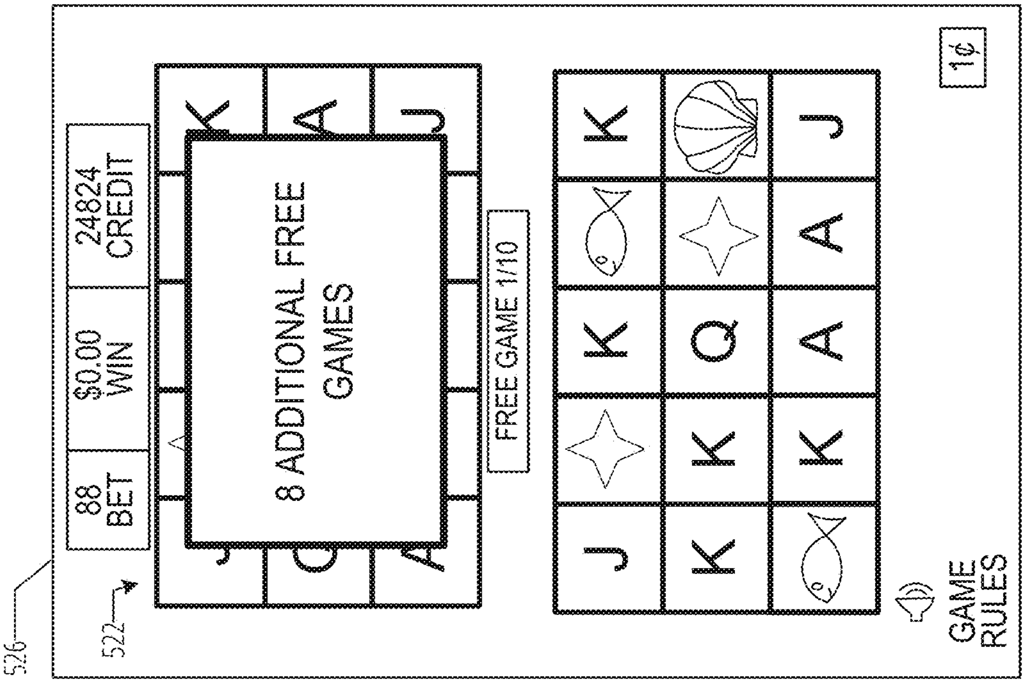
Figure 5G:
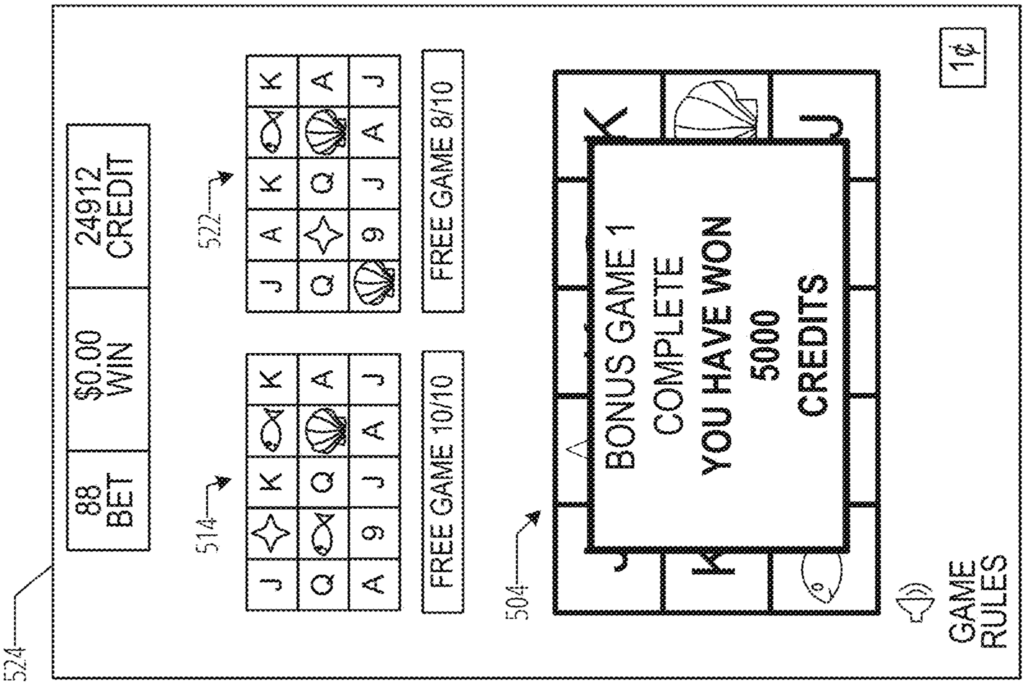

FIG. 5G illustrates display screen 524 in which a number of spins have occurred on both of the feature games. As illustrated, the feature game being presented in feature game window 514 has used its last free spin. Accordingly, a message may be presented in base game window 504 informing the player of their credit wins for the first feature game. Then, the first feature game may be deactivated (e.g., operation 424).

Because the second feature game that is presented in feature game window 522 still has free spins, a display screen such as display screen 526 in FIG. 5H may be presented. Here, it can be seen that feature game window 514 is no longer presented and feature game window 522 has been resized to take advantage of the newly available display screen area. Additionally, feature game window 522 indicates that an outcome of an instance of the second feature game has triggered additional free games. Thus, the spin counter beneath feature game window 522 is shown as resetting to one.

FIG. 6A to FIG. 6E are figures depicting example display screens that represent stages of game play in accordance with the process described in FIG. 4. The display screens depict an example in which inactive and active feature games are presented to the player. The information on the display screens may be presented on a single display device or across multiple display devices of a gaming device 200 (e.g., primary game display 240, secondary game display 242, etc.).

Figure 6B:
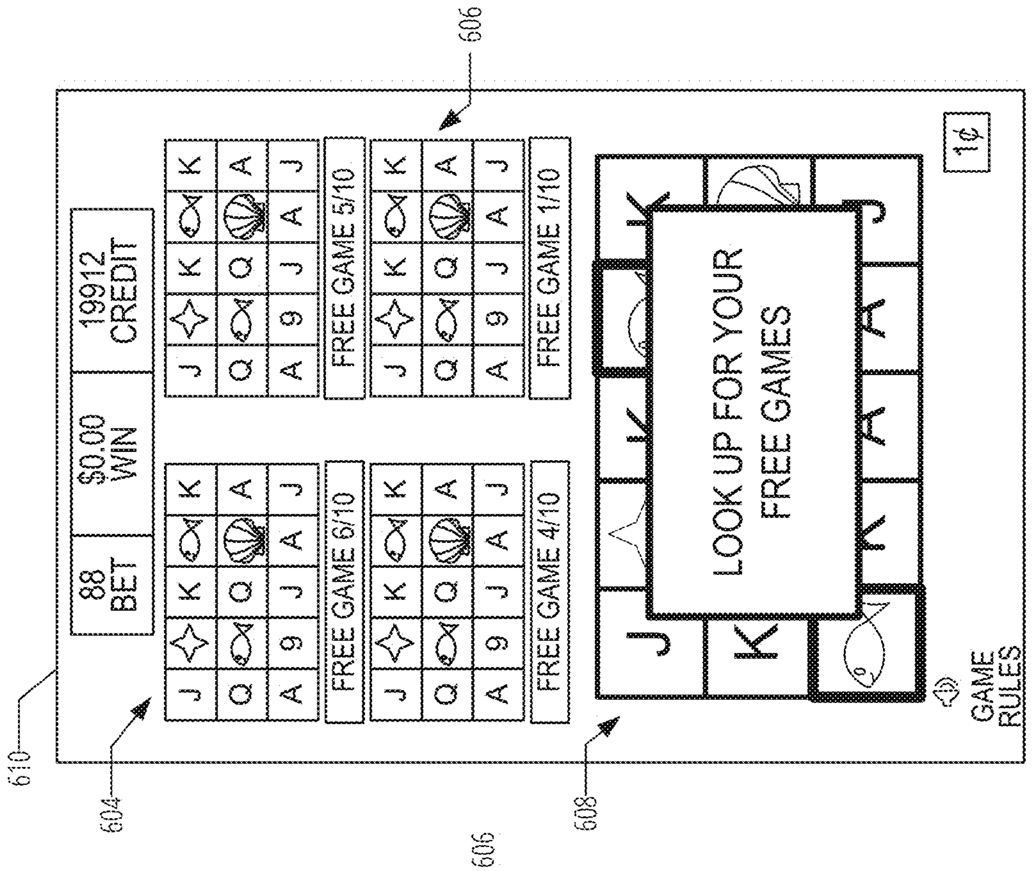
FIG. 6A-FIG. 6E are figures depicting example display screens that represent stages of game play, according to various examples.
Figure 6A:
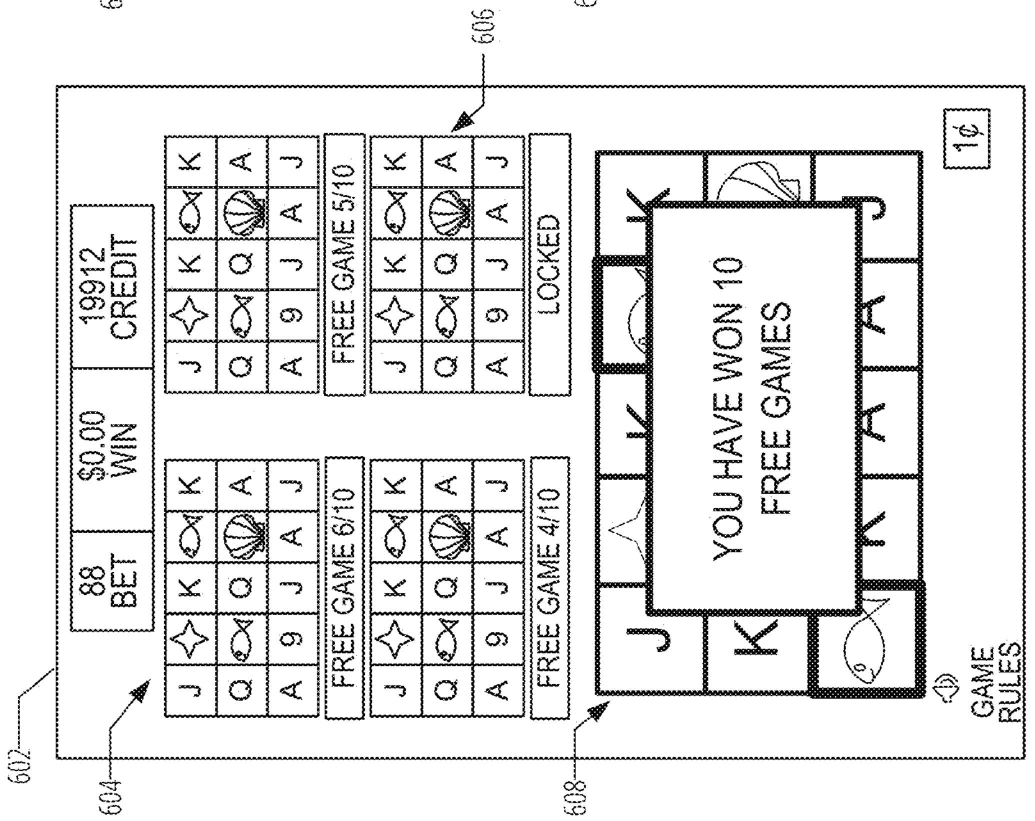

FIG. 6A illustrates display screen 602 in which there four possible feature games and three of the feature games have been unlocked based on the most recent outcomes of the base game and three active feature games. Display screen 602 includes a window for each feature game (e.g., feature game window 604) and a window for the base game (e.g., base game window 608). In this example, the feature game windows are all presented as smaller than the base game window 608, but other examples may have different sizing (e.g., all windows are the same size).

Feature game window 606 presents an inactive feature game. In this scenario, a message is presented below feature game window 606 to indicate to the player that the feature game is presently locked.

At the current stage of game play in FIG. 6A, an outcome of the base game indicates the player has won 10 free games. Moving to FIG. 6B, which depicts display screen 610, a message is presented to the player for them to look up to see their new feature game. As shown, the message beneath feature game window 606 has changed to indicate the current spin count of the feature game and has removed the message indicating the feature game was locked (e.g., inactive).

Figure 6D:
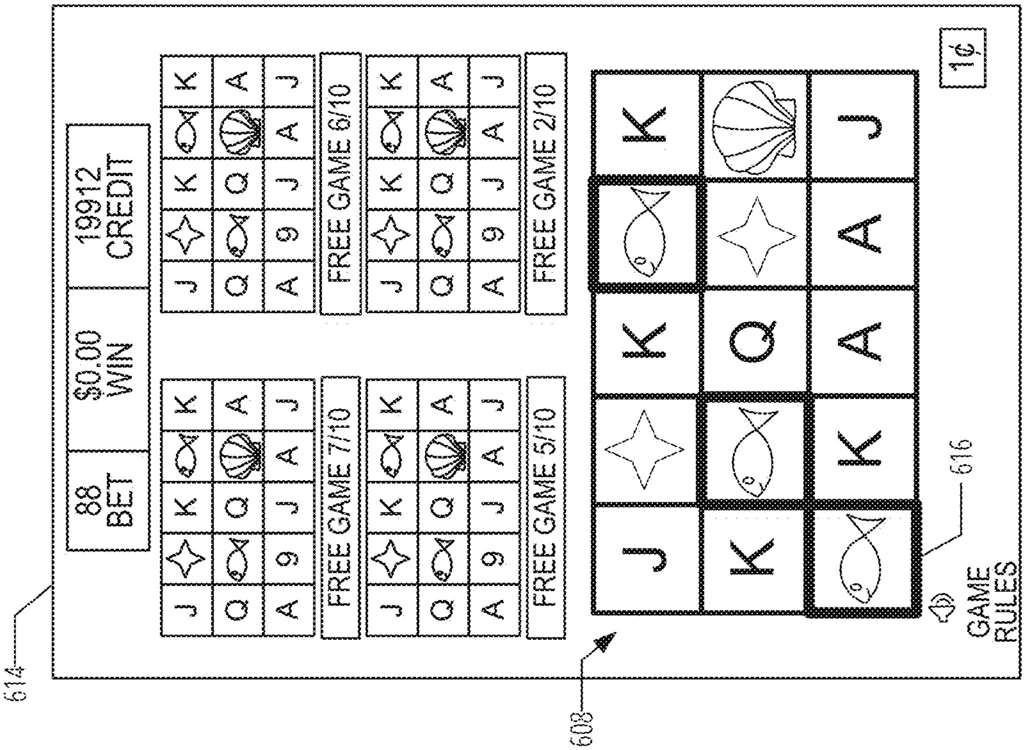
Figure 6C:
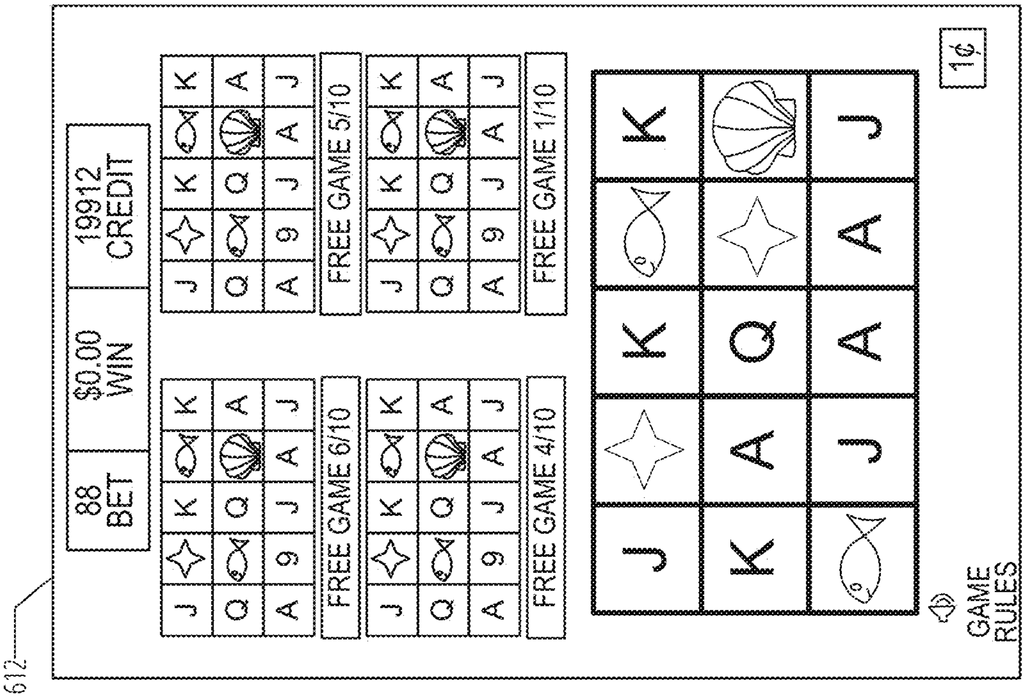

FIG. 6C illustrates display screen 612. At this stage, each of the feature games and base game have had new game outcomes determined (e.g., by making RNG calls to game processing backend system 314 or RNG 212) with corresponding symbols received and displayed. Each spin counter has also been increased for each feature game. Display screen 612 depicts that no payouts (e.g., no winning symbol combinations) occurred based on the determined outcomes.

FIG. 6D illustrates display screen 614 in which another instance of game play has concluded for each feature game and the base game. The outcome of the base game depicted in base game window 608 includes three trigger symbols (e.g., trigger symbol 616). The presence of three trigger symbols may result in a feature game trigger condition being satisfied. Display screen 614, however, also shows that despite the feature game trigger condition being satisfied, there are no more inactive feature games.

Figure 6E:
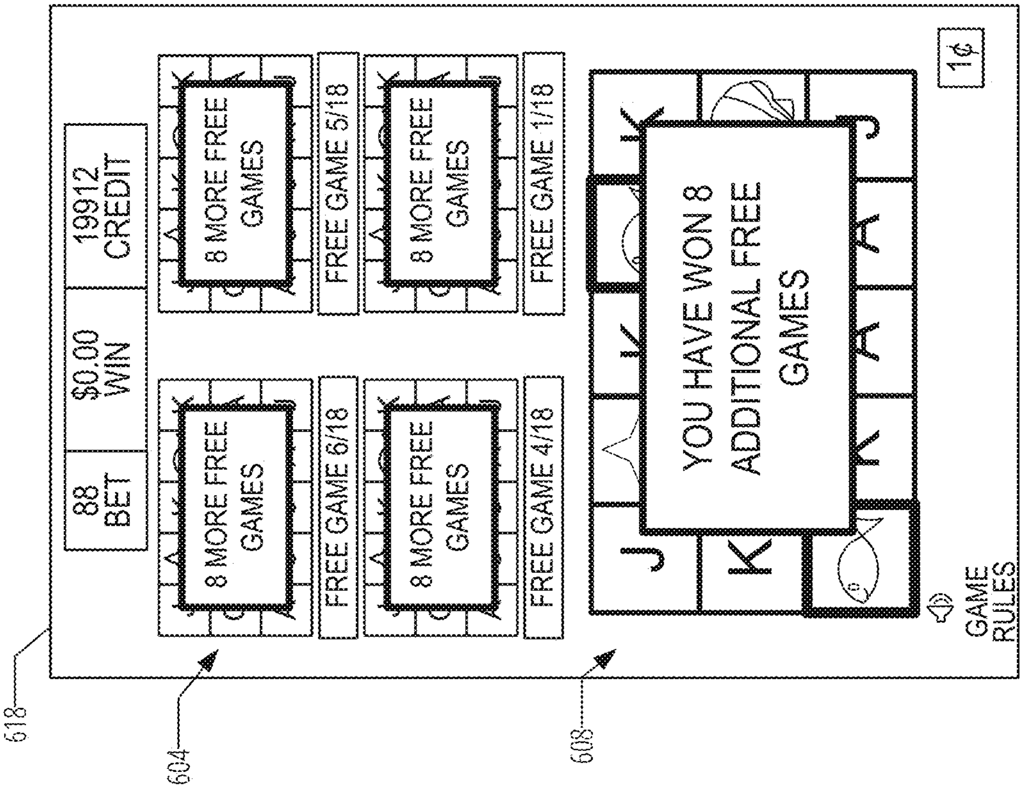

FIG. 6E illustrates display screen 618. This screen may be presented after FIG. 6D to inform the user that they have won additional free games on their existing feature games because no new feature games could be activated. As illustrated, a message is presented in base game window 608 as well as for each of the active feature games.

Figure 7:
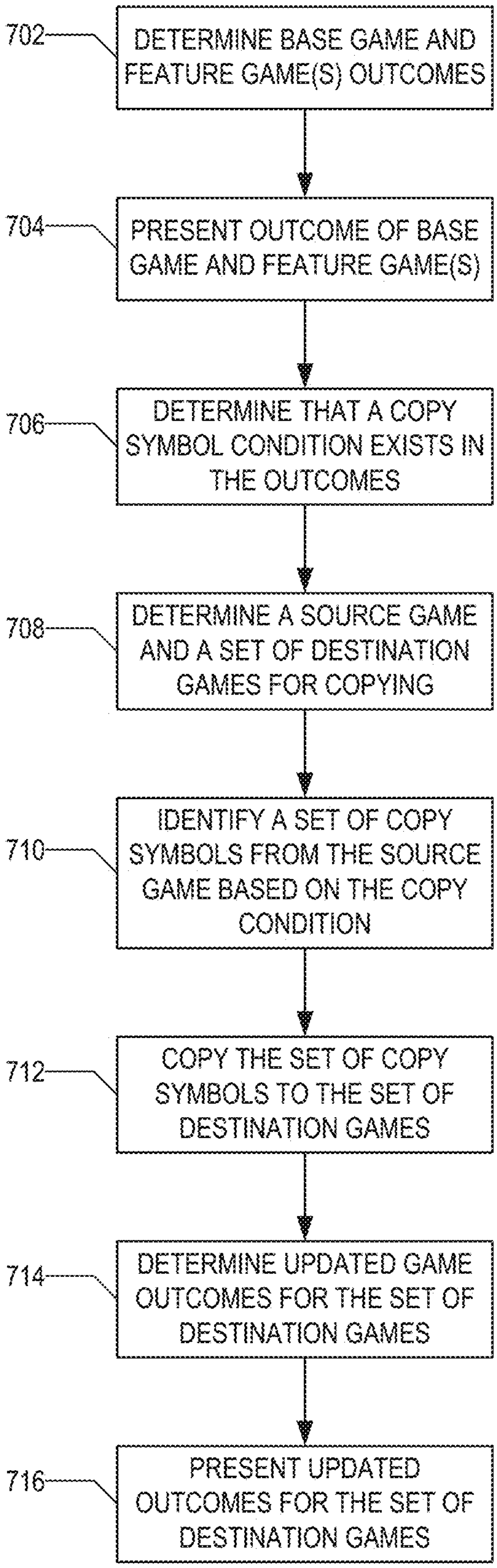
FIG. 7 is a flowchart illustrating a set of operations of a process to copy symbols between a feature games and base game, according to various examples.

FIG. 7 is a flowchart 700 illustrating a set of operations of a process to copy symbols between a feature games and base games, according to various examples. The process may be implemented using gaming device 200 and the components illustrated in FIG. 3, in various examples.

The operations of flowchart 700 already assumes that at least one feature game has been activated and is currently being displayed concurrently with a base game. For example, at operation 702, outcomes for a base game and one or feature game(s) are determined. Operation 702 may occur in a similar process pattern as operations 408 and 420 with respect to FIG. 4. The outcomes may be determined based on one or more calls to gaming RNG engine 318 from game play UI 304 and bonus game play UI 308 or RNG 212 in various examples.

The outcomes may identify which symbols are to be presented by game play UI 304 and bonus game play UI 308 after a spin of a reel is stopped at operation 704. For example, the base game and each active feature game may be configured to have five reels, each with three possible symbols displayed per reel. Each reel may its own set of possible symbols. If an outcome of the base game or feature game(s) results in the player winning credits, the credits may be awarded to the player. In this manner, the potential copying of symbols would not take away a winning combination of symbols in the base game or feature game.

At operation 706, it may be determined that a copy symbol condition exists in one of the outcomes of the base game or feature games. For example, game processing backend system 314 or memory 208 may store a set of rules that define one or more copy symbol conditions. A copy symbol condition may be defined in a number of manners. For example, a copy symbol condition may be the presence of a wild symbol or multiplier symbol in a game outcome as stored in RNG conversion engine 320.

Another copy symbol condition may be a threshold number of a certain type of symbol. For example, a copy symbol condition may be established based on the presence of one or more value symbols, for example, such as a credit symbol, a jackpot symbol (e.g. Mini, Minor, Major, and Grand), a "wild" symbol, etc.; and such a copy symbol condition may require a selected number of any one or more symbols. For example, a copy symbol condition might require three credit symbols, potentially in a specific relationship to one another; but might require presence of only one (or more) jackpot symbols. The copy symbol condition may also be based on more than one criterion. For example, consider that the feature game is a hold-and-spin feature in which certain symbols (e.g., credit symbols) remain static between spins. After a number of spins, there may enough credit symbols to meet the threshold, but another criterion may be that the hold-and-spin feature completes. Accordingly, additional credit symbols may accumulate before the copy symbol condition is satisfied.

In various examples, the copy symbol conditions may be based on a specific arrangement of symbols. Consider an outcome of a feature game in which there is a vertical stack of three credit symbols in a first reel and a second reel with two stacked credit symbols (see, for example, FIG. 8A). In an example, the copy symbol condition may specify that only the three vertically stacked credit symbols are copied. In other examples, all the credit symbols in an outcome may be copied.

At operation 708, in various examples, a source game and a set of destination games for copying are determined. In an example, the source game may be the game instance (e.g., of a base game or feature game) in which the copy symbol condition has been satisfied. The destination games may be one or more of the other active games. Game processing backend system 314 may be configured in a variety of ways to determine the destination games. In some instances, for example, if the source game is a feature game, the destination game may be only the base game. In other examples, if the source game is a feature game, the destination games may be the base game and any other active feature games. In another example, if the source game is the base game the destination games may be all active feature games.

At operation 710, a set of symbols (e.g., a set of copy symbols) to copy from the source game to the destination game(s) are identified based on the copy symbol condition. In an example, the set of symbols are the symbols that satisfied the copy symbol condition. For example, the set of symbols may be any wild symbol present in the source game. The identification may also include the relative location of any identified copy symbols in the source game. For example, if the source game includes five reels with three symbols displayed for each row, the identification may be [1st reel, top position] or if a coordinate system is used [1, 1].

At operation 712, in various examples, the set of copy symbols may be copied to the destination games. For example, UI system 302 may update game play UI 304 or bonus game play UI 308 corresponding to the destination games. Updating may include replacing the symbols of the destination games with the set of copy symbols. The location of each symbol in the set of copy symbols in the destination games may correspond to the location of the symbol in the source game. Thus, if the position of a copied symbol is [1,1] in the source game, the symbol at position at [1,1] in a destination game may be replaced.

At operation 714, updated game outcomes for the destination games may be determined, and at operation 716 the updated outcomes may be presented. An updated game outcome may include determining if a payout condition (e.g., a payline) based on the change to the symbols in the destination game. For example, game processing backend system 314 or game controller 202 may perform the same analysis as would normally occur to determine if a payout exists.

Figure 8B:
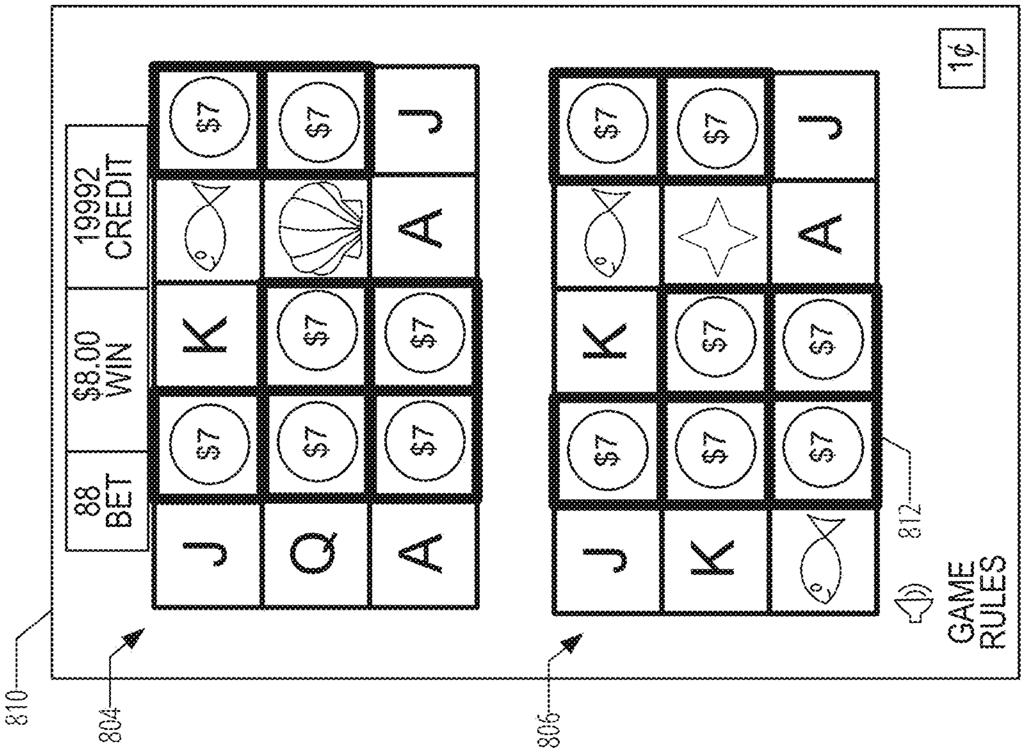
FIG. 8A and FIG. 8B are figures depicting example display screens that represent stages of game play, according to various examples.
Figure 8A:
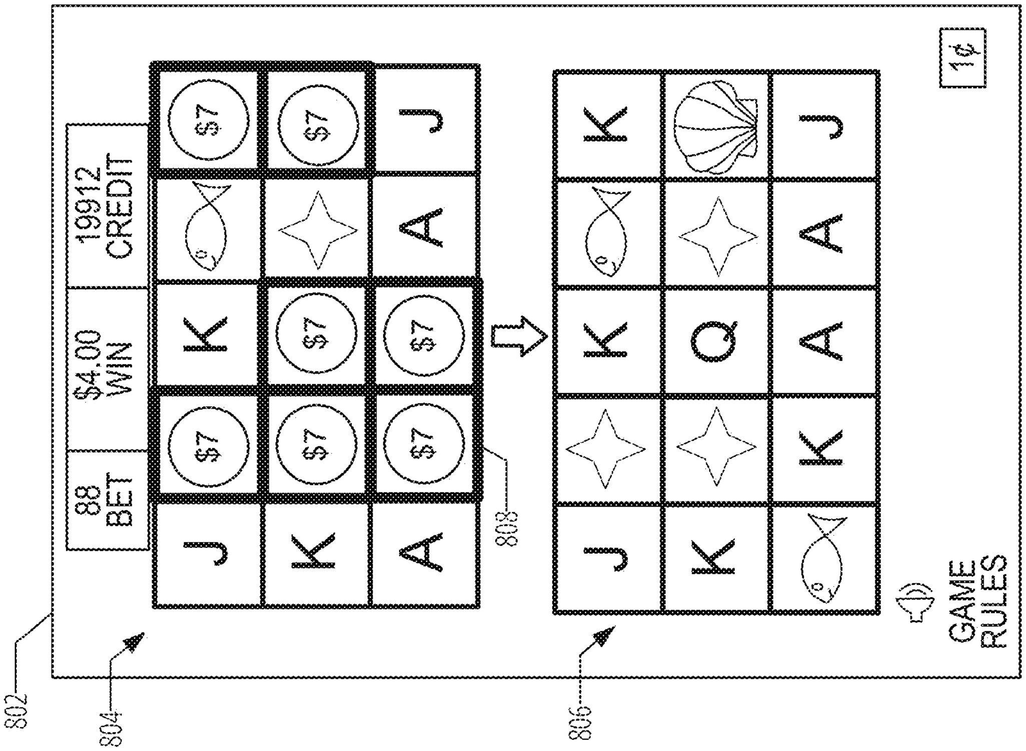

FIG. 8A and FIG. 8B are figures depicting example display screens that represent stages of game play in accordance with the process described in FIG. 7. In various examples, FIG. 8A and FIG. 8B illustrate a copy condition associated with credit symbols.

FIG. 8A illustrates display screen 802 that includes feature game window 804 and base game window 806. Feature game window 804 and base game window 806 may be displayed on primary game display 240 and/or secondary game display 242 in accordance with various examples.

As depicted, feature game window 804 includes a copy symbol condition in the outcome of the feature game. As discussed previously, the copy symbol condition may be based on a minimum number (and possibly arrangement) of value symbols. In the depicted example of feature game window 804, the copy symbol condition may be the presence of a minimum number of credit symbols (e.g., credit symbol 808). In this instance, feature game window 804 includes seven credit symbols in the feature game outcome. Thus, the feature game would be the source game for symbol copying, and the base game would be the destination game for symbol copying. Furthermore, the set of copy symbols would include each of the credit symbols. However, as noted above relative to operation 706 of FIG. 7, the set of copy symbols may include only credit symbols and/or other value symbols that appear in a specified relation to one another (for example, in a single row or column).

Display screen 810 illustrates the result of the copying (e.g., operation 712). As illustrated, seven symbols in base game window 806 have been replaced with the credit symbols (e.g., credit symbol 812) from feature game window 804. Additionally, the locations of the copied symbols correspond with the credit symbol locations in feature game window 804.

Figure 9B:
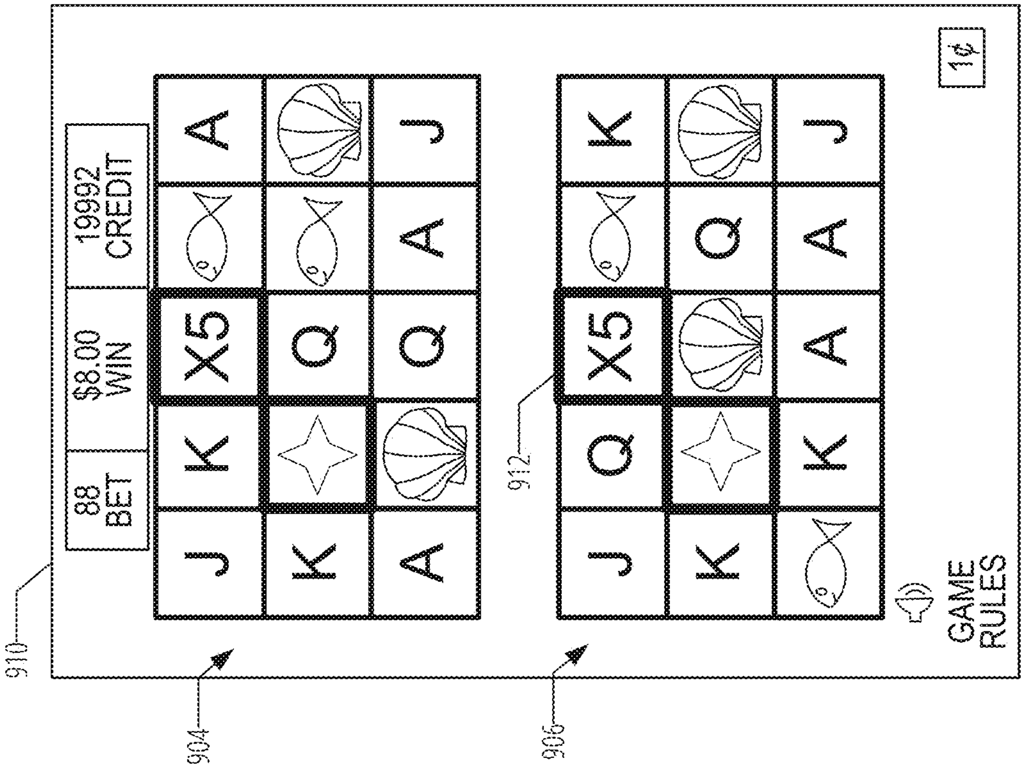
FIG. 9A and FIG. 9B are figures depicting example display screens that represent stages of game play, according to various examples.
Figure 9A:
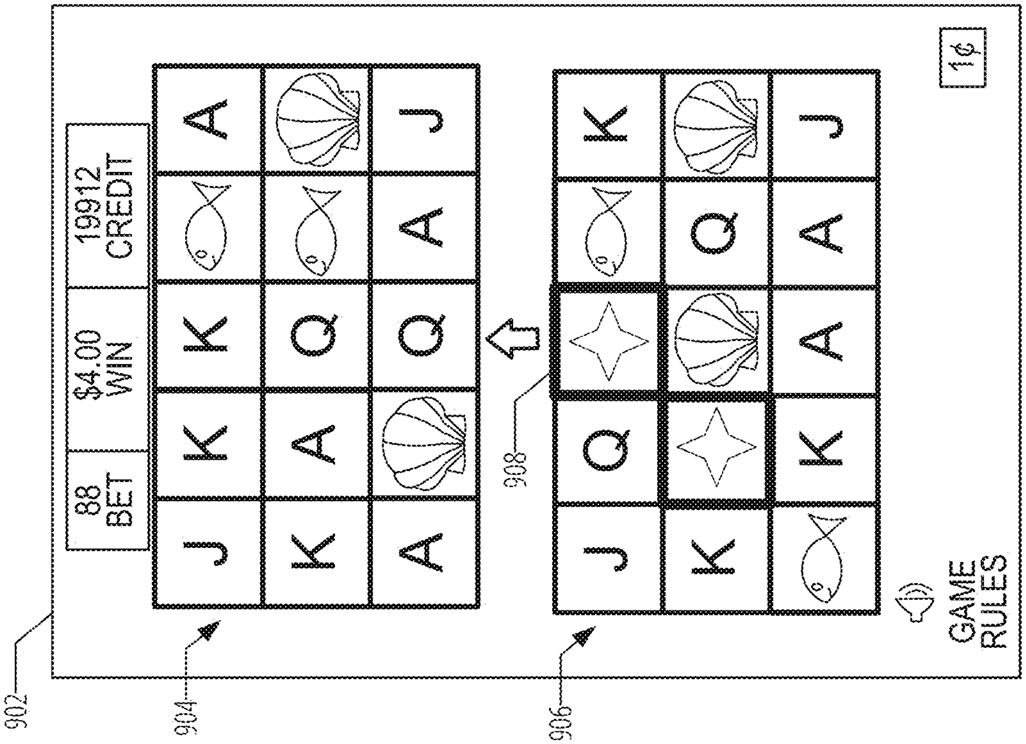

FIG. 9A and FIG. 9B are figures depicting example display screens that represent stages of game play in accordance with the process described in FIG. 7. In various examples, FIG. 9A and FIG. 9B illustrate a copy condition associated with wild symbols.

FIG. 9A illustrates display screen 902 that includes feature game window 904 and base game window 906. Feature game window 904 and base game window 906 may be displayed on primary game display 240 and/or secondary game display 242 in accordance with various examples.

As depicted, base game window 906 includes two wild symbols signified by the four-point star shape (e.g., wild symbol 908). The copy symbol condition may be the presence of any wild symbols in a game outcome. Thus, the base game is the source game and the feature game is the destination game. If more than one feature game was active (as depicted in FIG. 6A), each feature game may be a destination game for the symbol copy functionality. The set of copy symbols may be the two wild symbols.

In various examples a wild symbol may change into another form of configurable symbol, for example a multiplier symbol as illustrated in display screen 910. Accordingly, when wild symbol 908 is copied to feature game window 904, it may be copied as a multiplier symbol (e.g., multiplier symbol 912).

Figure 10B:
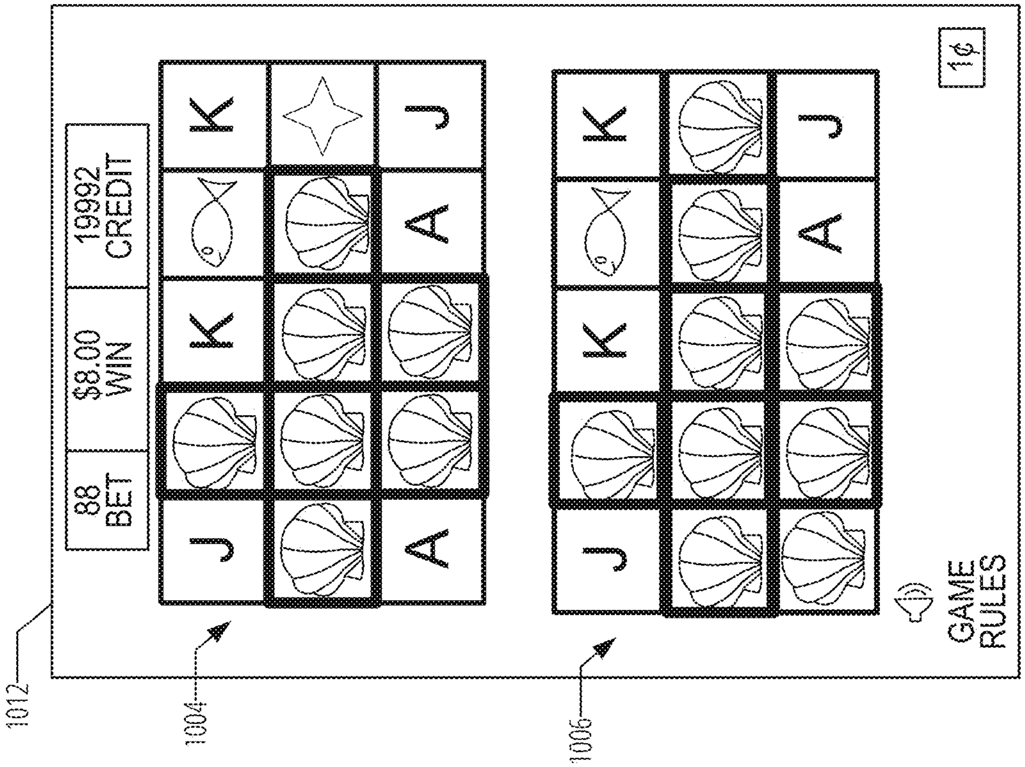
FIG. 10A and FIG. 10B are figures depicting example display screens that represent stages of game play, according to various examples.
Figure 10A:
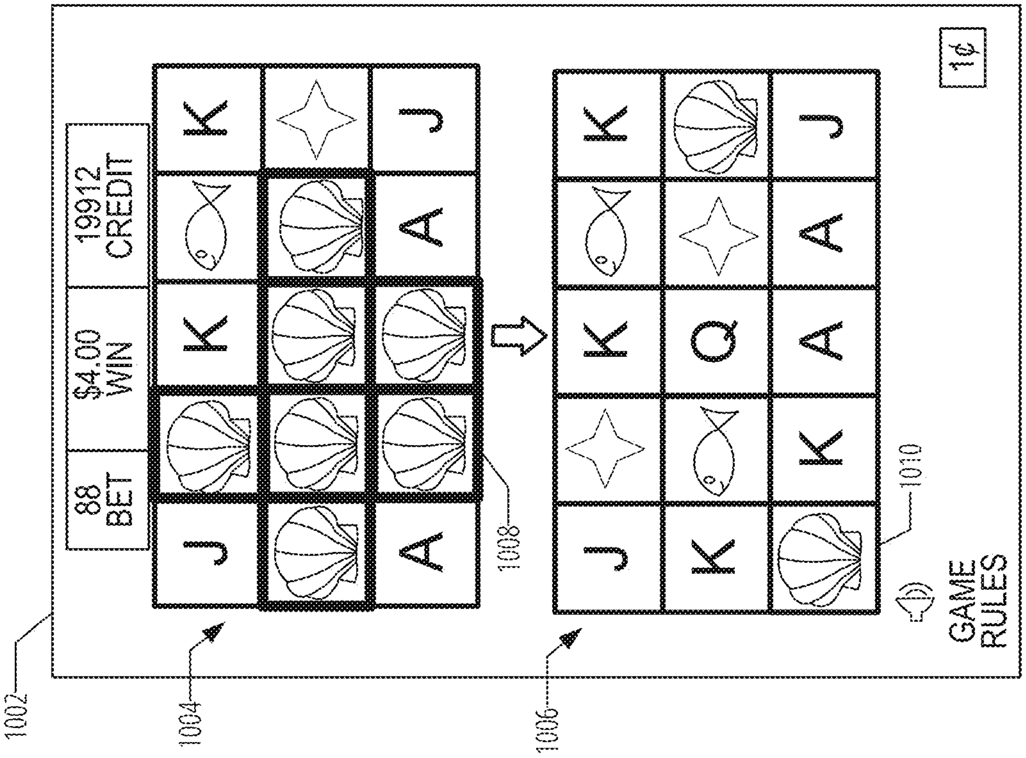

FIG. 10A and FIG. 10B are figures depicting example display screens that represent stages of game play in accordance with the process described in FIG. 7. In various examples, FIG. 10A and FIG. 10B illustrate a copy condition associated with real power symbols.

A real power symbol may be a symbol that is paid out based on the number of symbols in order (e.g., from left to right) and in each reel. For example, if there are two real power symbols in the first reel and three real power symbols in the second reel a 6× multiplier may be used to determine a payout. However, if there is a blank reel between the real power symbols no winning condition may exist.

FIG. 10A illustrates display screen 1002 that includes feature game window 1004 and base game window 1006. Feature game window 1004 includes seven real power symbols (e.g., real power symbol 1008). The copy symbol condition may be the presence of any real power symbols. As illustrated base game window 1006 also includes two real power symbols (e.g., real power symbol 1010). When multiple windows have real power symbols game processing backend system 314 or game controller 202 may default to copying from a feature game to a base game. Other rules may be used in other situations (e.g., all real power symbols are copied to each additional ongoing game) without departing from the scope of this disclosure.

Accordingly, the feature game may be the source game and the base game may be the destination game. The set of copy symbols may be each of the real power symbols in feature game window 1004. Display screen 1012 illustrates the result of the copying. The updated game outcome (e.g., operation 714) may be a 12X multiplier whereas originally there was none in display screen 1002.

Figure 11:
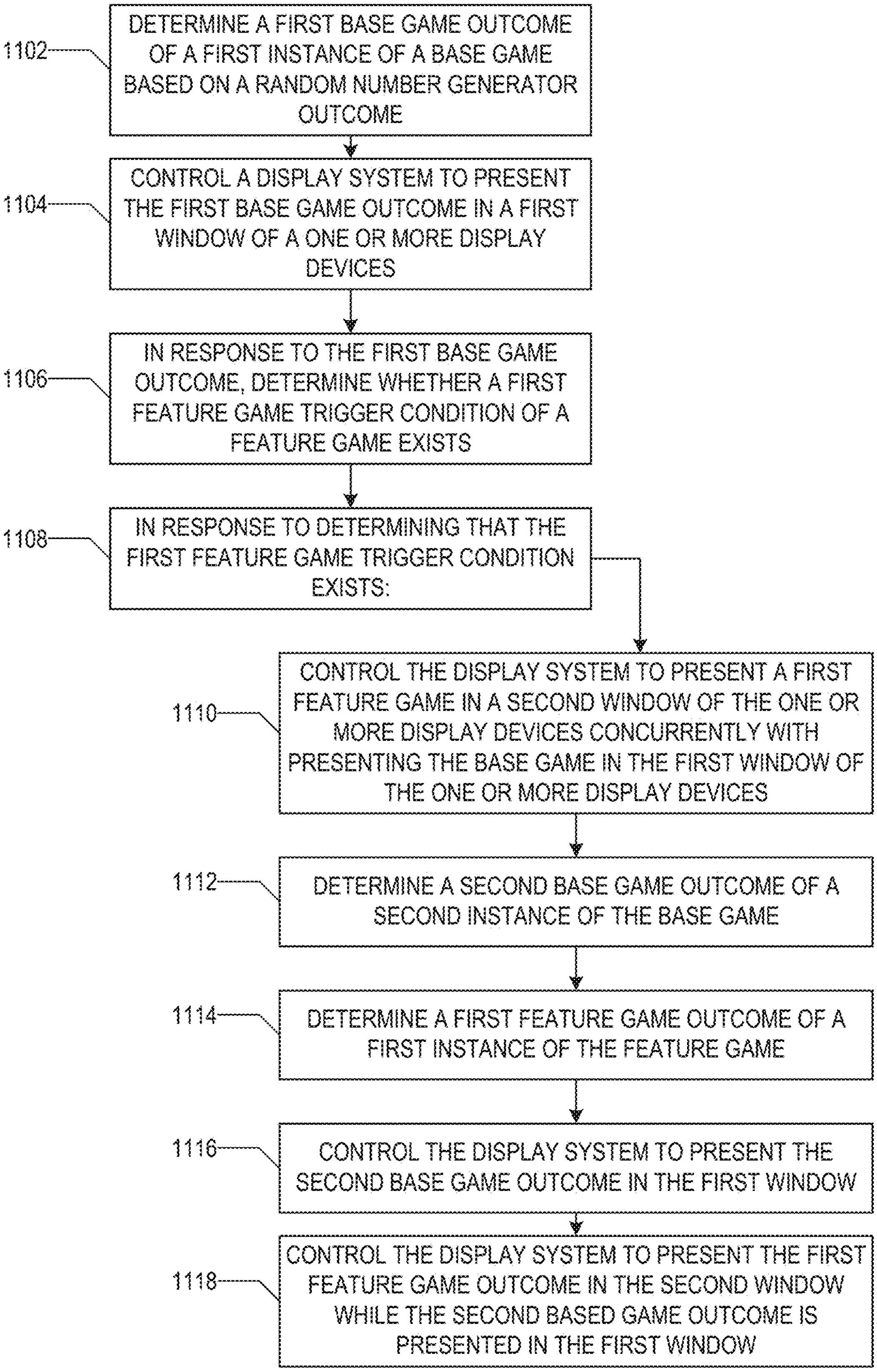
FIG. 11 is a flowchart illustrating a set of operations of a process to concurrently play a base game and a feature game, according to various examples.

FIG. 11 is a flowchart 1100 illustrating a set of operations of a process to concurrently play a base game and a feature game, according to various examples. The process may be implemented using gaming device 200 and the components illustrated in FIG. 3, in accordance with various examples. For example, a game controller (202) of a gaming device (e.g., gaming device 200) may execute instructions on one or more processors of the gaming device to cause the gaming device 200 to perform the operations of FIG. 11.

Actions taken in operation 1102 may include determining a first base game outcome of a first instance of a base game. For example, a call may be issued to an RNG to determine the base game outcome. Further details of determining outcomes are discussed above in FIG. 4.

Actions taken in operation 1104 may include controlling a display system to present the first base game outcome in a first window of the one or more display devices. The one or more display devices may be part of the gaming device in various examples.

Actions taken in operation 1106 may include, in response to the first base game outcome, determining whether a first feature game trigger condition of a feature game exists. Further details of determining whether of trigger condition exists are discussed above in FIG. 4.

Actions taken in operation 1108 may include performing a set of actions in response to determining that the first feature game trigger condition exists. For example, the actions taken may include operation 1110 in which the display system is controlled to present a first feature game in a second window of the one or more display devices concurrently with presenting the base game in the first window of the one or more display devices. In various examples, the display system may be controlled to present an indication (e.g., a message, animation, or graphical image) that the first feature game trigger condition has been met.

Actions taken in operation 1112 may include determining a second base game outcome of a second instance of the base game. Further details of determining game outcomes are discussed above in FIG. 4.

Actions taken in operation 1114 may include determining a first feature game outcome of a first instance of the feature game. Further details of determining game outcomes are discussed above in FIG. 4.

Actions taken in operation 1116 may include controlling the display system to present the second base game outcome in the first window.

Actions taken in operation 1118 may include controlling the display system to present the first feature game outcome in the second window.

In various examples, spins of the feature game and base game are performed synchronously. In other examples, the spins are performed asynchronously.

The instructions may further cause the game controller to perform additional operations. For example, an operation may include determining that a second feature game trigger condition exists and in response to this determination, controlling the display system to present a second feature game in a third window of the one or more display devices. In an example, the second feature game may be displayed in the third window as inactive before the second feature game trigger condition exists.

In an example, a frequency of wild symbols per reel in the second feature game is greater than a frequency of wild symbols per reel in the first feature game. In an example, a return to player value of the second feature game is greater than a return to player value of the first feature game. In an example, the game controller may be caused to control the display system to present reels of the second feature game as spinning during the first instance of the base game and when the second feature game is inactive.

In an example, the game controller is caused to resize the second window based on the second feature game trigger condition existing. In an example, the second feature game trigger condition existing is based on the second base game outcome of the base game. In an example, the second feature game trigger condition existing is based on the first feature game outcome.

In various examples, the instructions may further cause the game controller to perform additional operation related to copying symbols between windows. For example, the game controller may be caused to determine that a copy symbol condition exists in a second outcome of a second instance of the first feature game. Then, the game controller may be caused to identify a set of symbols (e.g., a set of copy symbol) and their symbol locations in the second outcome of the second instance to copy from the first feature game to the base game and to the second feature game. Then, the game controller may be caused to copy the set of symbols to the base game and second feature game in symbol locations of the base game and second feature game corresponding to the respective symbol locations in the second outcome of the second instance of the first feature game.

The instructions may further cause the game controller to perform additional operations. For example, an operation may include determining that a third feature game trigger condition exists. In response to this determination the game controller may be caused to determine that a maximum number of feature games are active. Then in response to this determination, the game controller may be caused to increase a free spin counter of the first feature game and the second feature game.

In various examples, the instructions may further cause the game controller to perform additional operation related to copying symbols from the base game to the feature game. For example, the game controller may be caused to determine that a copy symbol condition exists in the second base game outcome. Then, the game controller may be caused to identify a set of symbols (e.g., a set of copy symbols) and their respective symbol locations in the second base game outcome to copy from the base game to the feature game. Then, the game controller may be caused to copy the set of symbols to the first feature game in symbol locations of the first feature game corresponding to the respective symbol locations in the second base game outcome.

After the copying, the game controller may be further caused to determine an updated game outcome for the first instance of the first feature game based on the copied set of symbols. Then, the display system may be caused to present the updated game outcome.

In various examples, the instructions may further cause the game controller to perform additional operation related to copying symbols from the feature game to the base game. For example, the game controller may be caused to determine that a copy symbol condition exists in the first feature game outcome. Then, the game controller may be caused to identify a set of symbols (e.g., a set of copy symbols) and their symbol locations in the first feature game outcome to copy from the first feature game to the base game. After the identification, the game controller may be caused to copy the set of symbols to the base game in symbol locations of the first feature game corresponding to the respective symbol locations in the second base game outcome.

In an example, the copy symbol condition is based on a minimum number of symbols (e.g., three credit symbols or three wild symbols) being present in the first feature game outcome. In an example, the set of symbols includes a wild symbol. In an example, the set of symbols includes a credit symbol.

After the copying, the game controller may be caused to determine an updated game outcome for the second instance of the base game based on the copied set of symbols. Then, the display system may be controlled to present the updated game outcome.

Figure 12:
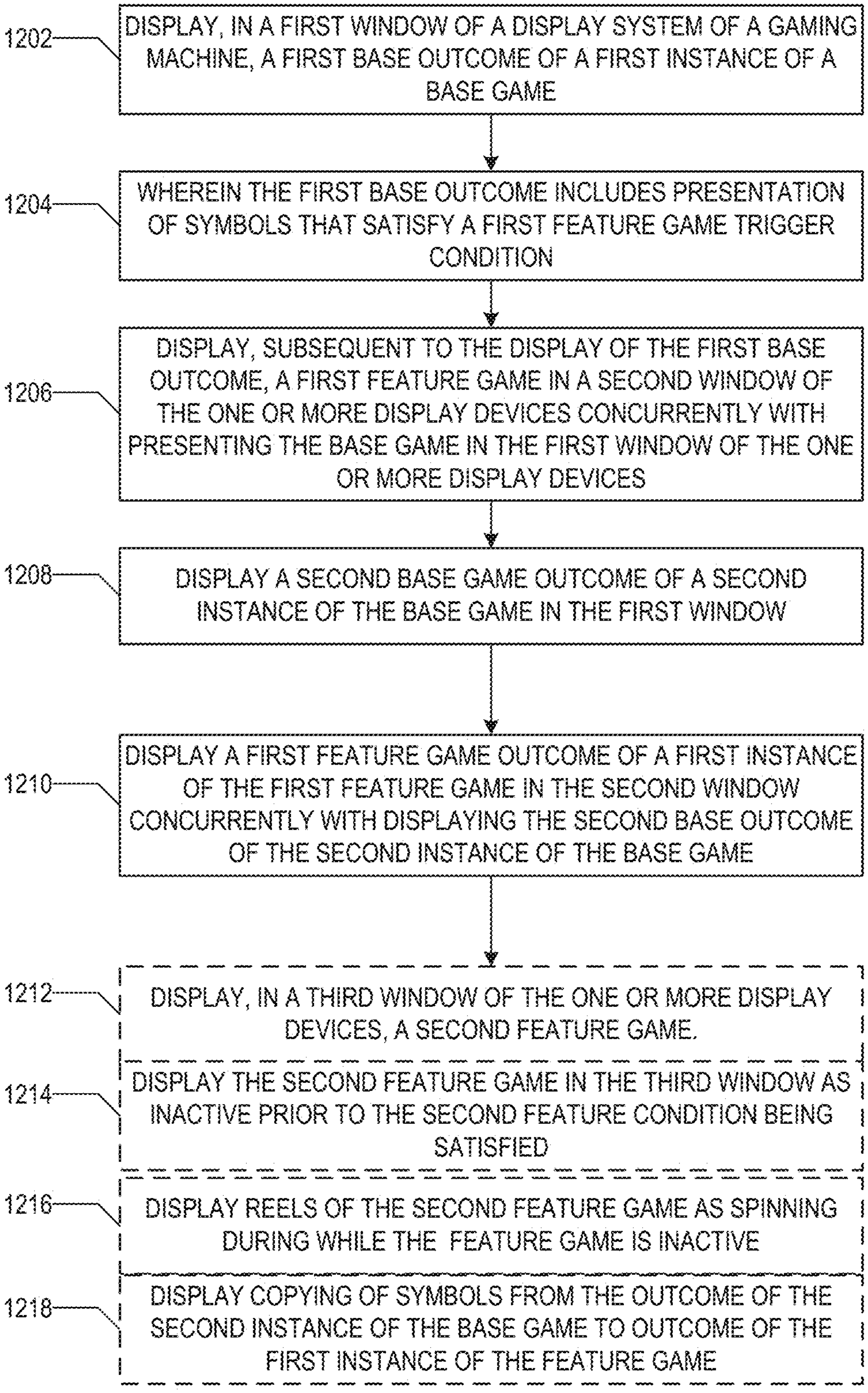
FIG. 12 is a flowchart illustrating a set of operations to concurrently display a base game and a feature game, according to various examples.

FIG. 12 is a flowchart 1200 illustrating a set of operations to concurrently display a base game and a feature game, according to various examples. In various examples, method includes presenting a player graphical user interface on a display system of a gaming machine (e.g., gaming device 200).

Operation 1202 may include displaying, in a first window of one of more display devices of the display system, a first base game outcome of a first instance of a base game. In an example (operation 404), the first base game outcome includes symbols that satisfy a first feature game trigger. In an example, an operation may include displaying, in the first window, an indication that the first feature game trigger condition has been satisfied. In various examples, operations may include displaying a spin of the base game and a spin of the first feature game synchronously. In various examples, operations may include displaying a spin of the base game and a spin of the first feature game asynchronously. Asynchronous play may include a gaming device receiving input with respect to the first base game for spinning, wagering, etc., while the feature game(s) spin automatically without additional user input.

Operation 1206 may include displaying, subsequent to the display of the first base outcome, a first feature game in a second window of the one or more display devices concurrently with presenting the base game in the first window of the one or more display devices.

Operation 1208 may include displaying a second base game outcome of a second instance of the base game in the first window.

Operation 1210 may include displaying a first feature game outcome of a first instance of the first feature game in the second window concurrently with displaying the second base outcome of the second instance of the base game Operation 1212 may include displaying, in a third window of the one or more display devices, a second feature game. In various examples, displaying the second feature game may be based on a second feature game trigger condition. Operation 1214 may include displaying the second feature game in the third window as inactive prior to the second feature condition being satisfied.

In various examples, operation 1216 may include displaying reels of the second feature game as spinning during while the feature game is inactive.

In various examples, operation 1218 may include displaying copying of symbols from the outcome of the second instance of the base game to outcome of the first instance of the feature game. In various examples, an operation may include displaying copying of symbols from the outcome of the first instance of the feature game to the outcome of the second instance of the base game.

Numerous embodiments are described in this disclosure and are presented for illustrative purposes only. The described embodiments are not, and are not intended to be, limiting in any sense. As an example, although the disclosure generally describes presenting simultaneously multiple bonus games in a Class III reel or slot game context the disclosure is not limited to this type of game and/or gaming device. For example, other implementations and/or portions of presenting simultaneously multiple bonus games may be implemented as a Class II gaming device. For example, a gaming device may present display screens shown in FIGS. 5A-6E, while implementing a Class II bingo game. Additionally, or alternatively, portions of the repeat accrual meter mechanic can be utilized for other types of wagering games, such as keno, lottery, and pachinko.

Example 1 is a gaming device comprising: a player interface; a display system comprising one or more display devices; a game controller comprising one or more processors, the game controller executing instructions which cause the game controller to: determine a first base game outcome of a first instance of a base game based on a random number generator outcome; control the display system to present the first base game outcome in a first window of the one or more display devices; and in response to the first base game outcome, determine whether a first feature game trigger condition of a feature game exists; in response to determining that the first feature game trigger condition exists: control the display system to present a first feature game in a second window of the one or more display devices concurrently with presenting the base game in the first window of the one or more display devices; determine a second base game outcome of a second instance of the base game; determine a first feature game outcome of a first instance of the feature game; control the display system to present the second base game outcome in the first window; and control the display system to present the first feature game outcome in the second window while the second base outcome is presented in the first window.

In Example 2, the subject matter of Example 1 wherein the instructions further cause the game controller to: determine that a second feature game trigger condition exists; and in response to the determination the second feature game trigger condition exists, control the display system to present a second feature game in a third window of the one or more display devices.

In Example 3, the subject matter of Example 2 wherein the second feature game trigger condition existing is based on the second base game outcome of the base game.

In Example 4, the subject matter of any one or more of Examples 2-3 wherein the second feature game trigger condition existing is based on the first feature game outcome.

In Example 5, the subject matter of any one or more of Examples 2-4 wherein the instructions further cause the game controller to: resize the second window based on the second feature game trigger condition existing.

In Example 6, the subject matter of any one or more of Examples 2-5 wherein the instructions further cause the game controller to: determine that a copy symbol condition exists in a second outcome of a second instance of the first feature game; identify a set of symbols and their symbol locations in the second outcome of the second instance to copy from the first feature game to the base game and to the second feature game; and copy the set of symbols to the base game and second feature game in symbol locations of the base game and second feature game corresponding to the respective symbol locations in the second outcome of the second instance of the first feature game.

In Example 7, the subject matter of any one or more of Examples 2-6 wherein the instructions further cause the game controller to: determine a third feature game trigger condition exists; and in response to determining that the third feature game trigger condition exists: determine that a maximum number of feature games are active; and in response to determining that the maximum number of feature games are active, increase a free spin counter of the first feature game and the second feature game.

In Example 8, the subject matter of any one or more of Examples 2-7 wherein the instructions further cause the game controller to: control the display system to display the second feature game in the third window as inactive before the second feature game trigger condition exists.

In Example 9, the subject matter of Example 8 wherein a return to player value of the second feature game is greater than a return to player value of the first feature game.

In Example 10, the subject matter of Example 9 wherein the instructions further cause the game controller to: control the display system to present reels of the second feature game as spinning during the first instance of the base game and when the second feature game is inactive.

In Example 11, the subject matter of any one or more of Examples 1-10 wherein a spin of the base game and a spin of the first feature game are performed synchronously.

In Example 12, the subject matter of any one or more of Examples 1-11 wherein a spin of the base game and a spin of the first feature game are performed asynchronously.

In Example 13, the subject matter of any one or more of Examples 1-12 wherein the instructions further cause the game controller to: determine that a copy symbol condition exists in the second base game outcome; identify a set of symbols and their respective symbol locations in the second base game outcome to copy from the base game to the feature game; and copy the set of symbols to the first feature game in symbol locations of the first feature game corresponding to the respective symbol locations in the second base game outcome.

In Example 14, the subject matter of Example 13 wherein the instructions further cause the game controller to: determine an updated game outcome for the first instance of the first feature game based on the copied set of symbols; and control the display system to present the updated game outcome.

In Example 15, the subject matter of any one or more of Examples 1-14 wherein the instructions further cause the game controller to: determine that a copy symbol condition exists in the first feature game outcome; identify a set of symbols and their symbol locations in the first feature game outcome to copy from the first feature game to the base game; and copy the set of symbols to the base game in symbol locations of the first feature game corresponding to the respective symbol locations in the second base game outcome.

In Example 16, the subject matter of Example 15 wherein the instructions further cause the game controller to: determine an updated game outcome for the second instance of the base game based on the copied set of symbols; and control the display system to present the updated game outcome.

In Example 17, the subject matter of any one or more of Examples 15-16 wherein the copy symbol condition is based on a minimum number of credit symbols being present in the first feature game outcome.

In Example 18, the subject matter of any one or more of Examples 15-17 wherein the set of symbols includes a wild symbol.

In Example 19, the subject matter of any one or more of Examples 15-18 wherein the set of symbols includes a credit symbol.

In Example 20, the subject matter of any one or more of Examples 1-19 wherein the instructions further cause the game controller to: control the display system to present an indication that the first feature game trigger condition has been met.

Example 21 is a method comprising: determining a first base game outcome of a first instance of a base game based on a random number generator outcome; controlling a display system to present the first base game outcome in a first window of one or more display devices of the display system; and in response to the first base game outcome, determining whether a first feature game trigger condition of a feature game exists; in response to determining that the first feature game trigger condition exists: controlling the display system to present a first feature game in a second window of the one or more display devices concurrently with presenting the base game in the first window of the one or more display devices; determining a second base game outcome of a second instance of the base game; determining a first feature game outcome of a first instance of the feature game; controlling the display system to present the second base game outcome in the first window; and controlling the display system to present the first feature game outcome in the second window while the second base outcome is presented in the first window.

In Example 22, the subject matter of Example 21 further includes determining that a second feature game trigger condition exists; and in response to the determination the second feature game trigger condition exists, controlling the display system to present a second feature game in a third window of the one or more display devices.

In Example 23, the subject matter of Example 22 wherein the second feature game trigger condition existing is based on the second base game outcome of the base game.

In Example 24, the subject matter of any one or more of Examples 22-23 wherein the second feature game trigger condition existing is based on the first feature game outcome.

In Example 25, the subject matter of any one or more of Examples 22-24 further includes resizing the second window based on the second feature game trigger condition existing.

In Example 26, the subject matter of any one or more of Examples 22-25 further includes determining that a copy symbol condition exists in a second outcome of a second instance of the first feature game; identifying a set of symbols and their symbol locations in the second outcome of the second instance to copy from the first feature game to the base game and to the second feature game; and copying the set of symbols to the base game and second feature game in symbol locations of the base game and second feature game corresponding to the respective symbol locations in the second outcome of the second instance of the first feature game.

In Example 27, the subject matter of any one or more of Examples 22-26 further includes determining a third feature game trigger condition exists; and in response to determining that the third feature game trigger condition exists: determining that a maximum number of feature games are active; and in response to determining that the maximum number of feature games are active, increasing a free spin counter of the first feature game and the second feature game.

In Example 28, the subject matter of any one or more of Examples 22-27 further includes controlling the display system to display the second feature game in the third window as inactive before the second feature game trigger condition exists.

In Example 29, the subject matter of Example 28 wherein a return to player value of the second feature game is greater than a return to player value of the first feature game.

In Example 30, the subject matter of Example 29 further includes controlling the display system to present reels of the second feature game as spinning during the first instance of the base game and when the second feature game is inactive.

In Example 31, the subject matter of any one or more of Examples 21-30 wherein a spin of the base game and a spin of the first feature game are performed synchronously.

In Example 32, the subject matter of any one or more of Examples 21-31 wherein a spin of the base game and a spin of the first feature game are performed asynchronously.

In Example 33, the subject matter of any one or more of Examples 21-32 further includes determining that a copy symbol condition exists in the second base game outcome; identifying a set of symbols and their respective symbol locations in the second base game outcome to copy from the base game to the feature game; and copying the set of symbols to the first feature game in symbol locations of the first feature game corresponding to the respective symbol locations in the second base game outcome.

In Example 34, the subject matter of Example 33 further includes determining an updated game outcome for the first instance of the first feature game based on the copied set of symbols; and controlling the display system to present the updated game outcome.

In Example 35, the subject matter of any one or more of Examples 21-34 further includes determining that a copy symbol condition exists in the first feature game outcome; identifying a set of symbols and their symbol locations in the first feature game outcome to copy from the first feature game to the base game; and copying the set of symbols to the base game in symbol locations of the first feature game corresponding to the respective symbol locations in the second base game outcome.

In Example 36, the subject matter of Example 35 further includes determining an updated game outcome for the second instance of the base game based on the copied set of symbols; and controlling the display system to present the updated game outcome.

In Example 37, the subject matter of any one or more of Examples 35-36 wherein the copy symbol condition is based on a minimum number of credit symbols being present in the first feature game outcome.

In Example 38, the subject matter of any one or more of Examples 35-37 wherein the set of symbols includes a wild symbol.

In Example 39, the subject matter of any one or more of Examples 35-38 wherein the set of symbols includes a credit symbol.

In Example 40, the subject matter of any one or more of Examples 21-39 controlling the display system to present an indication that the first feature game trigger condition has been met.

Example 41 is a non-transitory computer-readable storage medium, the computer-readable storage medium including instructions that when executed by a computer, cause the computer to: determine a first base game outcome of a first instance of a base game based on a random number generator outcome; control a display system to present the first base game outcome in a first window of one or more display devices of the display system; and in response to the first base game outcome, determining whether a first feature game trigger condition of a feature game exists; in response to determining that the first feature game trigger condition exists: control the display system to present a first feature game in a second window of the one or more display devices concurrently with presenting the base game in the first window of the one or more display devices; determine a second base game outcome of a second instance of the base game; determine a first feature game outcome of a first instance of the feature game; control the display system to present the second base game outcome in the first window; and control the display system to present the first feature game outcome in the second window while the second base outcome is presented in the first window.

In Example 42, the subject matter of Example 41 wherein the instructions further configure the computer to: determine that a second feature game trigger condition exists; and in response to the determination the second feature game trigger condition exists, control the display system to present a second feature game in a third window of the one or more display devices.

In Example 43, the subject matter of Example 42 wherein the second feature game trigger condition exist is based on the second base game outcome of the base game.

In Example 44, the subject matter of any one or more of Examples 42-43 wherein the second feature game trigger condition exist is based on the first feature game outcome.

In Example 45, the subject matter of any one or more of Examples 42-44 wherein the instructions further configure the computer to: resize the second window based on the second feature game trigger condition existing.

In Example 46, the subject matter of any one or more of Examples 42-45 wherein the instructions further configure the computer to: determine that a copy symbol condition exists in a second outcome of a second instance of the first feature game; identify a set of symbols and their symbol locations in the second outcome of the second instance to copy from the first feature game to the base game and to the second feature game; and copy the set of symbols to the base game and second feature game in symbol locations of the base game and second feature game corresponding to the respective symbol locations in the second outcome of the second instance of the first feature game.

In Example 47, the subject matter of any one or more of Examples 42-46 wherein the instructions further configure the computer to: determine a third feature game trigger condition exists; and in response to determining that the third feature game trigger condition exists: determine that a maximum number of feature games are active; and in response to determining that the maximum number of feature games are active, increase a free spin counter of the first feature game and the second feature game.

In Example 48, the subject matter of any one or more of Examples 42-47 wherein the instructions further configure the computer to: control the display system to display the second feature game in the third window as inactive before the second feature game trigger condition exists.

In Example 49, the subject matter of Example 48 wherein a return to player value of the second feature game is greater than a return to player value of the first feature game.

In Example 50, the subject matter of Example 49 wherein the instructions further configure the computer to: control the display system to present reels of the second feature game as spinning during the first instance of the base game and when the second feature game is inactive.

In Example 51, the subject matter of any one or more of Examples 41-50 wherein a spin of the base game and a spin of the first feature game are performed synchronously.

In Example 52, the subject matter of any one or more of Examples 41-51 wherein a spin of the base game and a spin of the first feature game are performed asynchronously.

In Example 53, the subject matter of any one or more of Examples 41-52 wherein the instructions further configure the computer to: determine that a copy symbol condition exists in the second base game outcome; identify a set of symbols and their respective symbol locations in the second base game outcome to copy from the base game to the feature game; and copy the set of symbols to the first feature game in symbol locations of the first feature game corresponding to the respective symbol locations in the second base game outcome.

In Example 54, the subject matter of Example 53 wherein the instructions further configure the computer to: determine an updated game outcome for the first instance of the first feature game based on the copied set of symbols; and control the display system to present the updated game outcome.

In Example 55, the subject matter of any one or more of Examples 41-54 wherein the instructions further configure the computer to: determine that a copy symbol condition exists in the first feature game outcome; identify a set of symbols and their symbol locations in the first feature game outcome to copy from the first feature game to the base game; and copy the set of symbols to the base game in symbol locations of the first feature game corresponding to the respective symbol locations in the second base game outcome.

In Example 56, the subject matter of Example 55 wherein the instructions further configure the computer to: determine an updated game outcome for the second instance of the base game based on the copied set of symbols; and control the display system to present the updated game outcome.

In Example 57, the subject matter of any one or more of Examples 55-56 wherein the copy symbol condition is based on a minimum number of credit symbols being present in the first feature game outcome.

In Example 58, the subject matter of any one or more of Examples 55-57 wherein the set of symbols includes a wild symbol.

In Example 59, the subject matter of any one or more of Examples 55-58 wherein the set of symbols includes a credit symbol.

In Example 60, the subject matter of any one or more of Examples 41-59 wherein the instructions further configure the computer to: control the display system to present an indication that the first feature game trigger condition has been met.

Example 61 is a method for presenting a player graphical interface on display system of a gaming machine, the method including: displaying, in a first window of one of more display devices of the display system, a first base game outcome of a first instance of a base game based on a random number generator outcome, wherein the first base game outcome includes symbols that satisfy a first feature game trigger; displaying, subsequent to the display of the first base outcome, a first feature game in a second window of the one or more display devices concurrently with presenting the base game in the first window of the one or more display devices; displaying a second base game outcome of a second instance of the base game in the first window; displaying a first feature game outcome of a first instance of the first feature game in the second window concurrently with displaying the second base outcome of the second instance of the base game.

In Example 62, the subject matter of Example 61 displaying, in a third window of the one or more display devices, a second feature game.

In Example 63, the subject matter of Example 62 wherein displaying the second feature game is based on a second feature game trigger condition.

In Example 64, the subject matter of Example 63 displaying the second feature game in the third window as inactive prior to the second feature condition being satisfied.

In Example 65, the subject matter of Example 64 displaying reels of the second feature game as spinning during while the feature game is inactive.

In Example 66, the subject matter of any one or more of Examples 61-65 displaying, in the first window, an indication that the first feature game trigger condition has been satisfied.

In Example 67, the subject matter of any one or more of Examples 61-66 displaying a spin of the base game and a spin of the first feature game synchronously.

In Example 68, the subject matter of any one or more of Examples 61-67 displaying a spin of the base game and a spin of the first feature game asynchronously.

In Example 69, the subject matter of any one or more of Examples 61-68 displaying copying of symbols from the outcome of the second instance of the base game to outcome of the first instance of the feature game.

In Example 70, the subject matter of any one or more of Examples 61-69 displaying copying of symbols from the outcome of the first instance of the feature game to the outcome of the second instance of the base game.

What is claimed is:

1. A gaming device comprising:

a display system comprising one or more display devices; and a game controller comprising:

one or more processors, and one or more memory devices comprising computer readable code which, when executed by the one or more processors, causes the gaming device to:

determine a maximum number of feature game windows equal to a number of active feature game windows and inactive feature game windows, the maximum number of feature game windows determined, in part, by a processing power needed for simultaneous play and determination of outcomes for the maximum number of feature game windows;

perform one or more calls to a gaming random number generator (RNG) engine to determine a first base game outcome and a plurality of feature game symbols of a first feature game, wherein the first base game outcome comprises a plurality of base game symbols based on the one or more calls;

control the display system to present:

the first base game outcome in a first window, and the first feature game in a second window of the number of feature game windows concurrently with the presentation of the first base game in the first window, wherein the first feature game is presented with a plurality of feature game symbols based on the one or more calls; and in response to a copy symbol condition being satisfied in the first feature game:

determine, based on a game processing backend configuration, that a copy destination game for the copy symbol condition is the first base game, replace a subset of the plurality of base game symbols in the first window with a subset of the plurality of feature game symbols from the first feature game in the second window such that the one or more symbols appear in the first window and the second window, and control the display to present an updated base game outcome comprising the subset of the plurality of feature game symbols and one or more unreplaced base game symbols.

2. The gaming device of claim 1, further comprising:

a user input device, wherein the computer readable code further causes the gaming device to:

provide operation of a second instance of the first base game synchronously with a first instance of the first feature game;

receive a spin input via the user input device; and determine, in response to the spin input:

a second base game outcome of the second instance of the first base game, and a first feature game outcome of the first instance of the first feature game.

3. The gaming device of claim 2, further comprising computer readable code to:

control the display system to present the second base game outcome in the first window; and control the display system to present the first feature game outcome in the second window such that the second base game outcome and the first feature game outcome are presented concurrently.

4. The gaming device of claim 3, further comprising computer readable code to:

detect that a second feature game trigger condition is satisfied; and in response to detecting that the second feature game trigger condition is satisfied, control the display system to present a second feature game in a third window of the display system, wherein the third window is presented concurrently with the first window and the second window.

5. The gaming device of claim 4, wherein the second feature game trigger condition is determined to be satisfied based on the second base game outcome for the second instance of the first base game.

6. The gaming device of claim 4, wherein the second feature game trigger condition is determined to be satisfied based on the first feature game outcome.

7. The gaming device of claim 4, further comprising computer readable code to:

determine a third feature game trigger condition is satisfied; and in response to determining that the third feature game trigger condition is satisfied:

determine that a maximum number of feature games are active based on the maximum number of feature game windows; and in response to determining that the maximum number of feature games are active, increase a free spin counter of the first feature game and the second feature game.

8. A non-transitory computer readable medium comprising computer readable code which, when executed by one or more processors, causes one or more processors to:

determine a maximum number of feature game windows equal to a number of active feature game windows and inactive feature game windows, the maximum number of feature game windows determined, in part, by a processing power needed for simultaneous play and determination of outcomes for the maximum number of feature game windows;

perform one or more calls to a gaming random number generator (RNG) engine to determine a first base game outcome and a plurality of feature game symbols of a first feature game, wherein the first base game outcome comprises a plurality of base game symbols based on the one or more calls;

control a display system to present:

the first base game outcome in a first window, and the first feature game in a second window concurrently with the presentation of the first base game in the first window, wherein the first feature game is presented with a plurality of feature game symbols based on the one or more calls; and in response to a copy symbol condition being satisfied in the first feature game:

determine, based on a game processing backend configuration, that a copy destination game for the copy symbol condition is the first base game, replace a subset of the plurality of base game symbols in the first window with a subset of the plurality of feature game symbols from the first feature game in the second window such that the one or more symbols appear in the first window and the second window, and control the display to present an updated base game outcome comprising the subset of the plurality of feature game symbols and one or more unreplaced base game symbols.

9. The non-transitory computer readable medium of claim 8, further comprising computer readable code to:

provide operation of a second instance of the first base game synchronously with a first instance of the first feature game;

receive a spin input via a user input device; and determine, in response to the spin input:

a second base game outcome of the second instance of the first base game, and a first feature game outcome of the first instance of the first feature game.

10. The non-transitory computer readable medium of claim 9, further comprising computer readable code to:

control the display system to present the second base game outcome in the first window; and control the display system to present the first feature game outcome in the second window such that the second base game outcome and the first feature game outcome are presented concurrently.

11. The non-transitory computer readable medium of claim 10, further comprising computer readable code to:

detect that a second feature game trigger condition is satisfied; and in response to detecting that the second feature game trigger condition is satisfied, control the display system to present a second feature game in a third window of the display system, wherein the third window is presented concurrently with the first window and the second window.

12. The non-transitory computer readable medium of claim 11, wherein the second feature game trigger condition is determined to be satisfied based on the second base game outcome for the second instance of the first base game.

13. The non-transitory computer readable medium of claim 11, wherein the second feature game trigger condition is determined to be satisfied based on the first feature game outcome.

14. The non-transitory computer readable medium of claim 11, further comprising computer readable code to:

determine a third feature game trigger condition is satisfied; and in response to determining that the third feature game trigger condition is satisfied:

determine that a maximum number of feature games are active based on the maximum number of feature game windows; and in response to determining that the maximum number of feature games are active, increase a free spin counter of the first feature game and the second feature game.

15. A method comprising:

determining a maximum number of feature game windows equal to a number of active feature game windows and inactive feature game windows, the maximum number of feature game windows determined, in part, by a processing power needed for simultaneous play and determination of outcomes for the maximum number of feature game windows;

performing one or more calls to a gaming random number generator (RNG) engine to determine a first base game outcome and a plurality of feature game symbols of a first feature game, wherein the first base game outcome comprises a plurality of base game symbols based on the one or more calls;

controlling a display system to present:

the first base game outcome in a first window, and the first feature game in a second window concurrently with the presentation of the first base game in the first window, wherein the first feature game is presented with a plurality of feature game symbols based on the one or more calls; and in response to a copy symbol condition being satisfied in the first feature game:

determining, based on a game processing backend configuration, that a copy destination game for the copy symbol condition is the first base game, replacing a subset of the plurality of base game symbols in the first window with a subset of the plurality of feature game symbols from the first feature game in the second window such that the one or more symbols appear in the first window and the second window, and control the display to present an updated base game outcome comprising the subset of the plurality of feature game symbols and one or more unreplaced base game symbols.

16. The method of claim 15, further comprising:

provide operation of a second instance of the first base game synchronously with a first instance of the first feature game;

receiving a spin input via a user input device; and determining, in response to the spin input:

a second base game outcome of the second instance of the first base game, and a first feature game outcome of the first instance of the first feature game.

17. The method of claim 16, further comprising:

controlling the display system to present the second base game outcome in the first window; and controlling the display system to present the first feature game outcome in the second window such that the second base game outcome and the first feature game outcome are presented concurrently.

18. The method of claim 17, further comprising:

detecting that a second feature game trigger condition is satisfied; and in response to detecting that the second feature game trigger condition is satisfied, controlling the display system to present a second feature game in a third window of the display system, wherein the third window is presented concurrently with the first window and the second window.

19. The method of claim 18, wherein the second feature game trigger condition is determined to be satisfied based on the first feature game outcome.

20. The method of claim 18, further comprising:

determining a third feature game trigger condition is satisfied; and in response to determining that the third feature game trigger condition is satisfied:

determining that a maximum number of feature games are active based on the maximum number of feature game windows; and in response to determining that the maximum number of feature games are active, increasing a free spin counter of the first feature game and the second feature game.

* * * * *